(12) United States Patent
Schubert et al.

(10) Patent No.: US 10,402,482 B2
(45) Date of Patent: Sep. 3, 2019

(54) CONTENT MANAGEMENT SYSTEM

(71) Applicant: OX SOFTWARE GMBH, Monheim (DE)

(72) Inventors: Svante Urs Schubert, Berlin (DE); Richard Landsman, Scotts Valley, CA (US)

(73) Assignee: OX SOFTWARE GMBH, Monheim (DE)

(*) Notice: Subject to any disclaimer, the term of this patent is extended or adjusted under 35 U.S.C. 154(b) by 429 days.

(21) Appl. No.: 14/861,837

(22) Filed: Sep. 22, 2015

(65) Prior Publication Data
US 2016/0012028 A1 Jan. 14, 2016

Related U.S. Application Data

(62) Division of application No. 13/969,433, filed on Aug. 16, 2013, now abandoned.

(60) Provisional application No. 61/691,250, filed on Aug. 20, 2012.

(51) Int. Cl.
G06F 17/24 (2006.01)
G06F 17/27 (2006.01)
G06F 17/22 (2006.01)

(52) U.S. Cl.
CPC ......... G06F 17/24 (2013.01); G06F 17/2205 (2013.01); G06F 17/2247 (2013.01); G06F 17/2264 (2013.01); G06F 17/2765 (2013.01); G06F 17/2785 (2013.01)

(58) Field of Classification Search
CPC ............ G06F 17/2205; G06F 17/2247; G06F 17/2264; G06F 17/24; G06F 17/2765; G06F 17/2785
See application file for complete search history.

(56) References Cited

U.S. PATENT DOCUMENTS

| 7,275,209 | B1* | 9/2007 | Jones | G06F 17/211 715/234 |
| 7,523,394 | B2* | 4/2009 | Jones | G06F 17/211 707/999.009 |
| 8,661,332 | B2* | 2/2014 | Dunietz | G06F 17/2288 715/209 |
| 2005/0149861 | A1* | 7/2005 | Bishop | G06F 9/543 715/209 |

(Continued)

OTHER PUBLICATIONS

"Data Exchange", Mar. 8, 2012, Semantic-mediawiki.org, pp. 2 (Year: 2012).*

(Continued)

Primary Examiner — Chau T Nguyen
(74) Attorney, Agent, or Firm — Maschoff Brennan

(57) ABSTRACT

A method may include receiving an input at design time specifying an application to support and receiving an input describing an application user scenario to support. The method may also include determining all possible semantic components required to support the application user scenario and determining all possible properties for the semantic components. The method may also include determining all possible operations in the application necessary to achieve the application user scenario. The method may also include mapping each operation to the semantic components and each property for the semantic components.

13 Claims, 21 Drawing Sheets

(56) References Cited

U.S. PATENT DOCUMENTS

2008/0163043 A1* 7/2008 van Eikeren ......... G06F 17/248
715/255
2009/0265339 A1* 10/2009 Chen ................... G06F 17/2247
2013/0159829 A1* 6/2013 James ............... G06F 17/30525
715/208
2015/0199307 A1* 7/2015 Zhang ............... G06F 17/30873
715/208

OTHER PUBLICATIONS

Word Online, Word Web App, "Differences between the Open Document Text(.odt) format and the Word (.docx) format used by Word Online", 2010, Microsoft Office, pp. 9 (Year: 2010).*
Thorsten Behrens et al., Select Committee on Change Tracking Report, Jul. 13, 2012.

* cited by examiner

Figure 6 — Prior Art

```
<office:body>
  <office:text>
    <text:p>A</text:p>
    <text:p>
      <draw:frame svg:height="26mm" svg:width="26mm">
        <draw:image xlink:href="http://home/pic.png"/>
      </draw:frame>
    </text:p>
    <text:p>B</text:p>
  </office:text>
</office:body>
```

```
{"name":"insertParagraph","start":[1],"attrs":{"paragraph":{}}},
{"name":"insertText","start":[1,1],"text":"A"},
{"name":"insertParagraph","start":[2],"attrs":{"paragraph":{}}},
{"name":"insertImage","start":[2,1],"attrs":{"image":{"imageUrl":"http://home/pic.png","height":2600,"width":2600}}},
{"name":"insertParagraph","start":[3],"attrs":{"paragraph":{}}},
{"name":"insertText","start":[3,1],"text":"B"}}
```

```
{"name":"insertParagraph","start":[1],"attrs":{"paragraph":{}}},
{"name":"insertText","start":[1,1],"text":"A"},
{"name":"insertParagraph","start":[2],"attrs":{"paragraph":{}}},
{"name":"insertImage","start":[2,1],"attrs":{"image":{}, "http://home/pic.png","height":2600,"width":2600}}},
{"name":"insertParagraph","start":[3],"attrs":{"paragraph":{}}},
{"name":"insertText","start":[3,1],"text":"B"}},
{"name":"insertText","start":[3,2],"text":"C"},
{"name":"splitParagraph","start":[3,2]}
```

Figure 19

```
<office:body>
  <office:text>
    <text:p>A</text:p>
    <text:p>
      <draw:frame svg:height="26mm" svg:width="26mm">
        <draw:image xlink:href="http://home/pic.png"/>
      </draw:frame>
    </text:p>
    <text:p>B</text:p>
    <text:p>C</text:p>
  </office:text>
</office:body>
```

Figure 20 ns of an example system for managing content;
CONTENT MANAGEMENT SYSTEM

PRIORITY CLAIM

This application is a Divisional of U.S. application Ser. No. 13/969,433, filed Aug. 16, 2013 which claims priority to under 35 U.S.C. § 119(e) to U.S. Provisional Application No. 61/691,250, entitled "SYNCHRONIZATION OF DATA MODELS OF DOCUMENT FORMATS TO ARCHIVE COLLABORATION WORK ON TO BE PRINTED DOCUMENTS" filed Aug. 20, 2012, the entirety of which is herein incorporated by reference.

FIELD

The embodiments discussed herein are related to a content management system. More particularly, the embodiments discussed herein relate to a content management system configured to receive a first content and provide semantically equivalent second content among same or different formats.

BACKGROUND

Users generate and edit content using various applications. Content can include documents, spreadsheets, etc. These applications can have various formats. For example, one common scenario is that two users are editing a document together. A first user uses a first application to edit the document and a second user uses a second application to edit the same document. The first application may be a first word processor and the second application may be a second word processor. The first application has a format that is different from the second application. The first user edits the document and e-mails it to the second user. The second user opens the document with the second application. To be opened by the second application the document will have to be transformed by the second application or some other application. Once opened by the second application, the document will have lost some data or formatting relative to how the document was rendered by the first application. In other words, upon being opened by the second application, the document is not a semantic equivalent to how the document was rendered by the first application. As a result, collaboration by the first user and the second user is hindered. Other examples are possible, but, for the sake of clarity, will not be repeated here.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include receiving an input at design time specifying an application to support and receiving an input describing an application user scenario to support. The method may also include determining all possible semantic components required to support the application user scenario and determining all possible properties for the semantic components. The method may also include determining all possible operations in the application necessary to achieve the application user scenario. The method may also include mapping each operation to the semantic components and each property for the semantic components.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 15-20 illustrate an example of data being processed by the content module.

DESCRIPTION OF EMBODIMENTS

The present disclosure relates to a content management system configured to receive a first content and provide semantically equivalent second content among same or different formats.

For example, in some implementations two users are editing a document together. A first user uses a first application to edit the document and a second user uses a second application to edit the same document. A first client device of the first user also includes a first content module such as the one described below in FIGS. 2-5B and 7-14. A second client device of the second user may also include a second content module. The first application may be a first word processor and the second application may be a second word processor. The first application has a format that is different from the second application.

The first user opens the document using the first application. The document has an associated operations list. The operations list includes a description of all the operations present in the document. The user provides inputs to the first application to edit the document. For example, the user adds a paragraph or moves some text.

As the user edits the document, the content module determines a combined operations list. The combined operations list includes a list of all the operations present in the document when the first user opened the document and all the operations which the first user has added to the document since the first user opened the document. The operations which the first user has added to the document include those operations associated with the first user's edits to the document.

The first user edits the document and e-mails it to the second user. The second user opens the document with the second application. The second content module determines a semantically equivalent version of the document so that, once opened by the second application, the document will not have lost any data or formatting relative to how the document was rendered by the first application. In other words, upon being opened by the second application and processed by the second content module, the document is a semantic equivalent to how the document was rendered by the first application. This example is one of many implementations of the content module. Other example implementations of the content module are described below.

Embodiments of the present invention will be explained with reference to the accompanying drawings.

Figure 1:
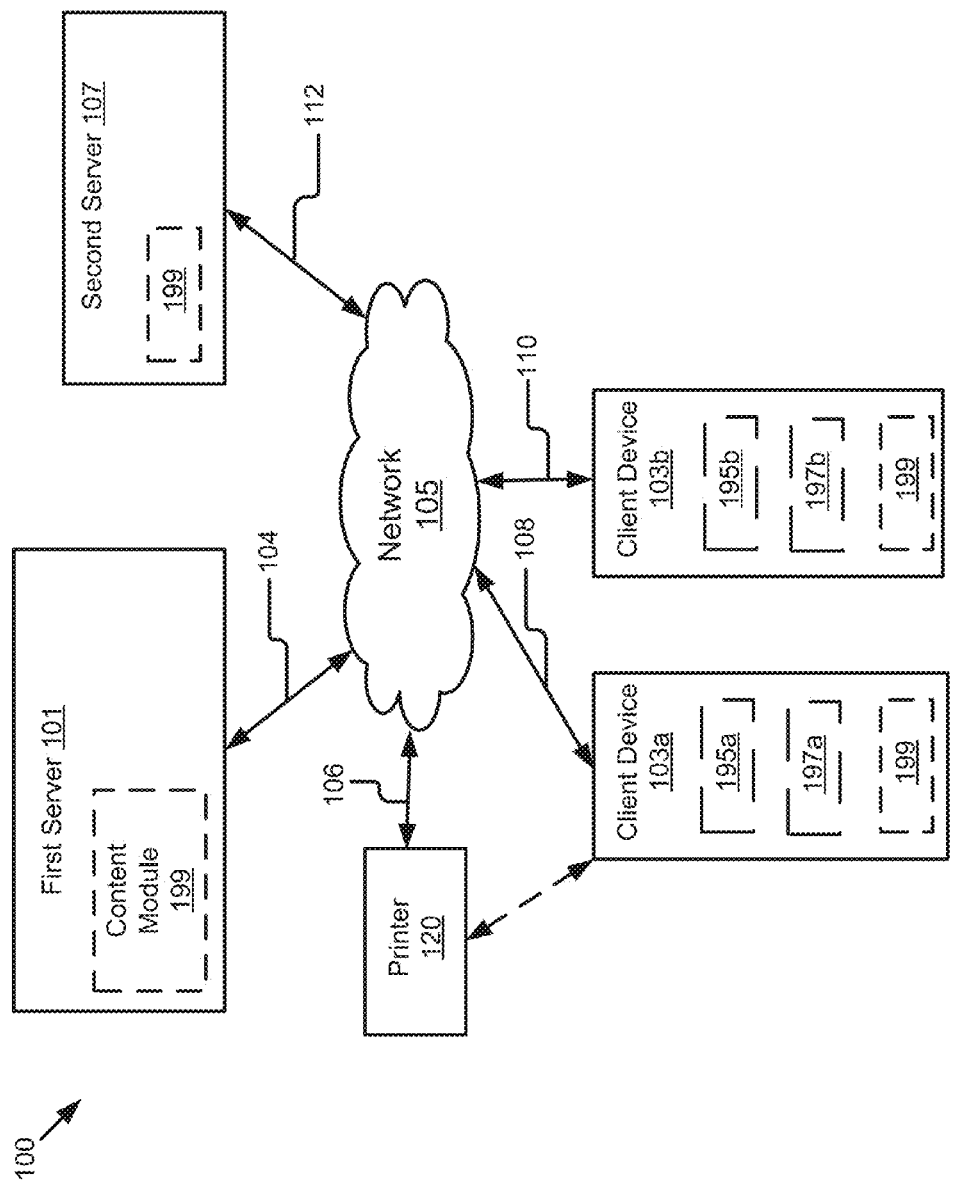
FIG. 1 illustrates a block diagram of some implementations of an example system for managing content.

FIG. 1 illustrates a block diagram of some implementations of a content management system 100 arranged in accordance with at least one embodiment described herein. The illustrated system 100 includes a first server 101, a second server 107, client devices 103a, 103b (also referred to herein individually and collectively as 103), and a printer 120. In the illustrated implementation, these entities of the system 100 are communicatively coupled via a network 105.

The client devices 103 in FIG. 1 may be used by way of example. While FIG. 1 illustrates two client devices 103a, 103b, the present disclosure applies to a system architecture having one or more client devices 103. Furthermore, although FIG. 1 illustrates one network 105 coupled to the client devices 103, the first server 101, the second server 107, and the printer 120, in practice one or more networks 105 may be connected to these entities. Furthermore, while FIG. 1 includes one first server 101, one second server 107, and one printer, the system 100 could include any number of these elements (including zero).

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, e-mail, etc.

The first server 101 may be a hardware server that includes a processor, a memory, and network communication capabilities. The first server 101 may include a database or any other persistent storage. In the illustrated implementation, the first server 101 is coupled to the network 105 via signal line 104. The first server 101 may send and receive data to and from one or more of the client devices 103 via the network 105.

In some implementations, the first server 101 may be a collaboration server to provide one or more client devices 103 the functionality to collaboratively edit documents similar to Google Docs or any other collaboration web service. The first server 101 may also be an e-mail server, social network server, peer-to-peer service provider, or any other web service provider.

In some implementations, the first server 101 includes a content module 199. The content module 199 may be code and routines for providing the functionality described below with reference to FIGS. 2-5B and 7-14. In some implementations, the content module 199 may be implemented using hardware including a field-programmable gate array ("FPGA") or an application-specific integrated circuit ("ASIC"). In some other implementations, the content module 199 may be implemented using a combination of hardware and software. In some implementations, the content module 199 may be stored in a combination of the client devices 103 and servers, or in one of the client devices 103 or servers. In some implementations, the content module 199 acts in part as a thin-client application that may be stored on the first server 101 and in part as elements that may be stored on the client device 103. Accordingly, the content module 199 is depicted in FIG. 1 using dashed lines and included in first server 101, second server 107, the first client device 103a, and the second client device 103b to indicate that any of these elements may include software, hardware, or a combination of hardware and software configured to provide some of the functionality of the content module 199. The content module 199 is described in more detail with reference to FIGS. 2-5B and 7-14.

The second server 107 is a hardware server that includes a processor, a memory, and network communication capabilities. The second server 107 may include a database or any other persistent storage. In the illustrated implementation, the second server 107 is coupled to the network 105 via signal line 112. The second server 107 may send and receive data to and from one or more of the client devices 103 via the network 105. The second server may provide functionality similar to the first server 101 described above. Accordingly, that description will not be repeated here.

The client device 103 may be a computing device that includes a memory and a processor. For example, the client device 103 may be a server, a laptop computer, a desktop computer, a tablet computer, a smartphone, a mobile telephone, a personal digital assistant ("PDA"), a mobile e-mail device, a portable game player, a portable music player, a television with one or more processors embedded therein or coupled thereto, or any other electronic device capable of executing applications or managing content. Managing content may include generating content, editing content, etc.

In the illustrated implementation, the first client device 103a is communicatively coupled to the network 105 via signal line 108 and the second client device 103b is communicatively coupled to the network 105 via signal line 110.

The first client device 103a may include a first application 195a. The first application 195a is code and routines for managing content. In some implementations the first application 195a may be a word processor application, spreadsheet application, slideshow application, database application, diagram application, or mathematical formula editor, etc. For example, the first application 195a may be any of the applications included in the Microsoft Office suite, LibreOffice suit, Apache OpenOffice suit, Apple iWork suite, or any other application capable of managing content such as a document, spreadsheet, slideshow, database, drawing, formula, etc.

The second client device 103b may include a first application 195b similar to the first application 195a. First applications 195a, 195b may be referred to collectively herein as first application 195.

The first client device 103a may include a second application 197a. The second application 197a is code and routines for managing content. In some implementations the second application 197a may be a word processor application, spreadsheet application, slideshow application, database application, diagram application, or mathematical formula editor, etc.

The second application 197a is similar to the first application 195a with the exception that the second application 197a has a different format than the first application 195a. For example, the first application 195a has a .docx format and the second application 197a has an .odt format.

The second client device 103b may include a second application 197b similar to the second application 197a. Second applications 197a, 197b may be referred to collectively herein as second application 197.

The printer 120 is a hardware printer. The client device 103 may include a driver for communicating with the printer 120. The client device 103 may print documents via the printer 120. The printer 120 is communicatively coupled to the network 105 via signal line 106. Optionally, the printer 120 may be directly coupled to a client device 103.

Assume that second client device 103b edits an .odt formatted document using the second application 197b. The document is rendered on a monitor (not pictured) associated with the second client device 103b. The second client device 103b e-mails the document to the first client device 103a via the first server 101, which in this example is configured as an e-mail server executing an e-mail application. The first client device 103a receives the document in an e-mail via the network 105. A user of the first client device 103a desires to open and print the document using a first application 195a which uses .docx format. The first client device 103a uses the content module 199 to open and render a semantically equivalent version of the document using the first application. The first client device 103a sends instructions to the printer 120 to print the document. Since the document is a semantically equivalent version of the document relative to how it was rendered by the second client device 103b, the printed document will have the same data and formatting as it did when rendered on the monitor associated with the second client device 103b.

Figure 2:
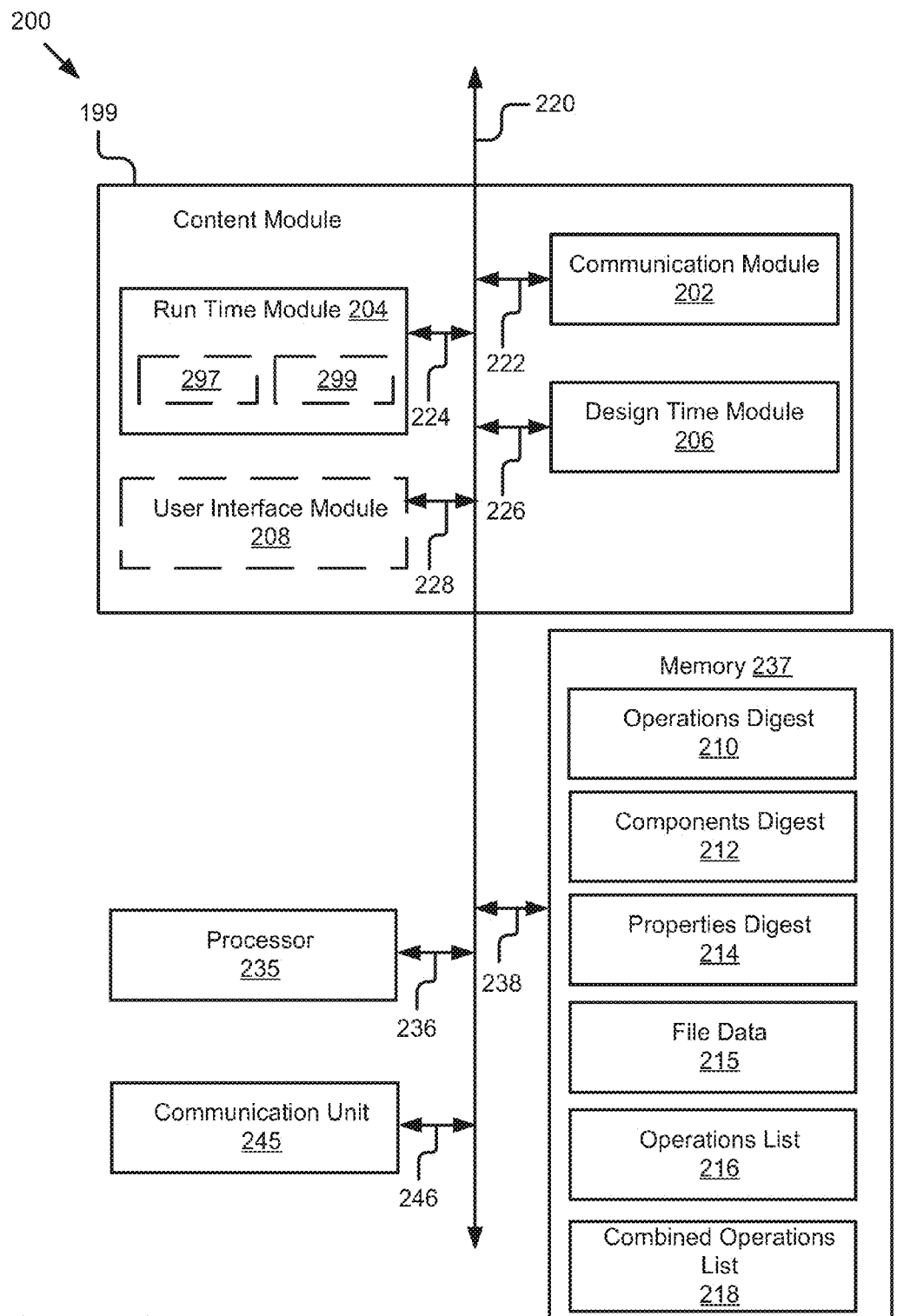
FIG. 2 illustrates a block diagram of some implementations of an example content module.

Referring now to FIG. 2, an example of the content module 199 is illustrated in accordance with at least one embodiment described herein. FIG. 2 is a block diagram of a computing device 200 that includes a content module 199, a first processor 235, a memory 237, and a communication unit 245 according to some examples. The elements of the computing device 200 are communicatively coupled by a bus 220. In some implementations, the computing device 200 may be a server, such as the first server 101 or second server 107 of FIG. 1. The computing device 200 may also be a client device, such as the client device 103 of FIG. 1. In some implementations, the functionality of the computing device 200 is provided by two or more content modules 199 implemented across any combination of the first sever 101, second server 107, first client device 103a, and the second client device 103b as depicted in FIG. 1. In these embodiments, the two or more content modules 199 may include less than all of the sub-elements 202, 204, 206, 208, 210, 212, 214 depicted in FIG. 2.

The first processor 235 may include an arithmetic logic unit, a microprocessor, a general purpose controller, or some other processor array to perform computations and provide electronic display signals to a display device. The first processor 235 is coupled to the bus 220 for communication with the other elements via signal line 236. The first processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 stores instructions or data that may be executed by the first processor 235. The instructions or data may include code for performing the techniques described herein. For example, the memory 237 may store all the instructions or data necessary for the content module 199 to provide its functionality as described below with reference to FIGS. 2-5B and 7-14.

The memory 237 is a non-transitory computer-readable storage medium. For example, the memory 237 may be a dynamic random access memory (DRAM) device, a static random access memory (SRAM) device, flash memory, or some other memory device.

In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 is coupled to the bus 220 via signal line 238.

The communication unit 245 may transmit data to any combination of a client device 103, first server 101, second server 107, and the printer 120 depending upon where the content module 199 may be stored. The communication unit 245 may receive data from any combination of a client device 103, first server 101, and second server 107 depending upon where the content module 199 may be stored. The communication unit 245 is coupled to the bus 220 via signal line 246.

In some implementations, the communication unit 245 includes a port for direct physical connection to a network, such as a network 105 of FIG. 1 or to another communication channel. For example, the communication unit 245 may include a port such as a USB, SD, RJ42, or similar port for wired communication with a client device. In some implementations, the communication unit 245 includes a wireless transceiver for exchanging data with the client device or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to a network for distribution of data using standard network protocols including TCP/IP, HTTP, HTTPS, and SMTP, etc.

In the implementation illustrated in FIG. 2, the content module 199 includes a communication module 202, a run time module 204, a design time module 206, and a user interface module 208. The user interface module 208 is depicted with a dashed line to indicate that it is an optional feature of the content module 199. These elements of the content module 199 are communicatively coupled to each other via the bus 220.

The communication module 202 is communicatively coupled to the bus 220 via signal line 222. The run time module 204 is communicatively coupled to the bus 220 via signal line 224. The design time module 206 is communicatively coupled to the bus 220 via signal line 226. The user interface module 208 is communicatively coupled to the bus 220 via signal line 228.

The communication module 202 may be software including routines for handling communications between the content module 199 and other elements of the computing device 200. In some implementations, the communication module 202 may be a set of instructions executable by the first processor 235 to provide the functionality described below for handling communications between the content module 199 and other elements of the computing device 200. In some instances, the communication module 202 may be stored in the memory 237 of the computing device 200 and may be accessible and executable by the first processor 235.

The communication module 202 sends and receives data via the communication unit 245, to and from one or more of a client device 103, first server 101, second server 107, and printer 120 as depicted in FIG. 1.

In some implementations, the communication module 202 receives data from elements of the content module 199 and stores the data in the memory 237. In some implementations, the communication module 202 retrieves data from the memory 237 and sends the data to one or more appropriate elements of the content module 199. In some implementations, the communication module 202 receives data from one or more appropriate elements of the content module 199 or the memory 237 and sends the data to other elements of a system communicatively coupled to the computing device 200, such as elements in the system 100 depicted in FIG. 1. The communication module 202 may be adapted for cooperation and communication with the first processor 235 and other elements of the computing device 200 via signal line 222.

The run time module 204 may be software including routines for transforming a file from a first content type to a second content type. In some implementations, the run time module 204 is configured to provide the functionality described below with reference to FIGS. 3A-3C and 7-14. In some implementations, the run time module 204 may be a set of instructions executable by the processor 235 to provide the functionality described herein with reference to FIGS. 3A-3C and 7-14. The run time module 204 may communicate with the communication module 202 to access data from memory 237 or store data in the memory 237. Examples of data accessed and stored by the run time module 204 include elements 210, 212, 214, 215, 216, 218.

In some implementations, the run time module 204 may include an operations producer 297 and an operations consumer 299. The operations producer 297 and the operations consumer 299 are sub-modules of the run time module 204 that may be software including routines for providing the functionality described below with reference to FIGS. 3A-3C and 7-14.

In some implementations, the run time module 204 may be stored in the memory 237 of the computing device 200 and may be accessible and executable by the processor 235. The run time module 204 may be adapted for cooperation and communication with the processor 235 and other elements of the computing device 200 via signal line 224.

The design time module 206 may be software including routines for building the operations digest 210, components digest 212, and the properties digest 214. In some implementations, the design time module 206 builds a single operations digest 210 describing all operations supported by the content module 199. By contrast, the design time module 206 may build a paired set of a components digest 212 and a properties digest 214 for each format supported by the content module 199.

For example, assume that the content module 199 supports the .odt format and the .doc format. The design time module 206 builds only one operations digest 210 even though the content module 199 supports two different formats, the .odt format and the .doc format. By contrast, the design time module 206 builds a different components digest 212 for each different supported format. The design time module 206 also builds a different properties digest 214 for each supported format. Accordingly, in this example the design time module 206 builds a first components digest 212a for the .odt format and a second components digest 212b for the .doc format. Similarly, the design time module 206 also builds a first properties digest 214a for the .odt format and a second properties digest 214b for the .doc format.

In some implementations, the content module 199 may support dozens, hundreds, or even thousands of different formats. In these implementations, the design time module 206 builds only one operations digest 210 describing the different operations supported by the content module 199. However, the design time module 206 builds a different components digest 212 for each different supported format. The design time module 206 also builds a different properties digest 214 for each supported format.

In some implementations, the design time module 206 is configured to provide the functionality described below with reference to FIGS. 4 and 5. In some implementations, the design time module 206 may be a set of instructions executable by the processor 235 to provide the functionality described herein with reference to FIGS. 4 and 5. The design time module 206 may communicate with the communication module 202 to access data from memory 237 or store data in the memory 237.

In some implementations, the design time module 206 may be stored in the memory 237 of the computing device 200 and may be accessible and executable by the processor 235. The design time module 206 may be adapted for cooperation and communication with the processor 235 and other elements of the computing device 200 via signal line 226.

The content module 199 may support any file format known in the art.

The user interface module 208 may be software including routines for generating a user interface. For example, the user interface module 208 accesses graphical data stored in the memory 237 (not pictured) and uses the graphical data to construct a user interface for display to a user of a client device 103, first server 101 or second server 107. The user interface may be used to provide a user input to the content module 199. For example, the user provides an input selecting a format for rendering or saving a file associated with content.

In some implementations, the user interface module 208 may be stored in the memory 237 of the computing device 200 and may be accessible and executable by the processor 235. The user interface module 208 may be adapted for cooperation and communication with the processor 235 and other elements of the computing device 200 via signal line 228.

The memory 237 may store an operations digest 210, one or more components digests 212, one or more properties digests 214, one or more sets of file data 215 associated with different content, one or more operations lists 216 associated with different file data 215, and one or more combined operations lists 218 associated with different file data 215. In one embodiment, the combined operations lists 218 for a given set of file data 215 is a modified operations list 216 and the memory only stores the combined operations list 218.

The file data 215 is data describing the persistent form of content. The content may have any format. The file data 215 may be included in a file. The content may be a document and the file data 215 includes data describing the persistent form of the document, such as OOXML, HTML, and ODF. The content may include one or more semantic components or properties describing the semantic components. For example, the content may be a document that includes a paragraph of text that has a certain font or font color.

An operation is data that describes a change of a semantic component or property. For example, a user opens a new document. The user provides inputs to a word processing application to input text that forms a paragraph. The operations are data that describe the changes to the document. In this example, the operations are data that describe the semantics of the text and paragraph.

In some implementations, an operation is data that describes a change of the XML elements of attributes representing a semantic entity.

The operations list 216 is data describing an ordered sequence of operations included in the content described by the file data 215. For example, the content is a new document that includes three paragraphs of text. The operations list 216 includes an ordered sequence of the operations necessary to create a second document that includes three paragraphs of text that are semantically equivalent to the three paragraphs included in the first document.

The combined operations list 218 is data describing two or more operations lists 216 that have been synchronized. For example, a user opens a new document and provides inputs to a word processing application to form three paragraphs of text having a certain format. The user may save the document. The document will have a first operations list 216 that describes the sequence of operations necessary to recreate the document. The user subsequently opens the document and changes the format of the three paragraphs and adds a fourth paragraph. The user may save this document as a new version. A second operations list 216 may include the sequence of operations that describe the changes to the semantic components and properties of the document. A combined operations list 218 includes the first operations list 216 synchronized with the second operations list 216, and the operations included in the combined operations list 218 may be sequenced so that they may recreate the operations included in the new version of the document. In other words, the combined operations list 218 may include the sequence of operations included in the first operations list 216 followed by the sequence of operations included in the second operations list 216.

In some implementations, the operations digest 210, components digest 212, and properties digest 214 include all the data and information necessary for the run time module 204 to provide its functionality. For example, the operations digest 210, components digest 212, and properties digest 214 include all the data and information necessary for the run time module 204 to provide the functionality described below with reference to FIGS. 3A-3C and 7-14.

The operations digest 210 is data describing one or more operations supported by the content module 199.

The components digest 212 includes component data that describes all the semantic components that are supported by the content module 199 for a particular format. The properties digest 214 includes property data that describes all possible properties for the semantic components described by a given components digest 212. The components digest 212 and the properties digest 214 are paired together for a specific format that is supported by the content module 199. In other words, the components digest 212 is format specific. The properties digest 214 is also format specific. The system 200 may have a different components digest 212 and a different properties digest 214 for each format supported by the content module 199. Each format supported by the content module 199 will be associated with one components digest 212 and one properties digest 214.

As described above, the components digest 212 includes component data and the properties digest 214 includes property data. The semantic components described by the component data may also be described as the abstract components of content having a particular format. Examples of semantic components include a table, paragraph, characters such as text or numbers, etc. In some implementations, the semantic components are any part of content which may be added, deleted, or modified by user actions. For example, assume there is a format named .sva for a word processing document that includes only five semantic components that are supported by the content module 199, and that these five semantic components are: headers; text; tables; images; and footers. Each of these semantic components may have one or more possible properties that are described by the properties data. At design time, the design time module 206 analyzes the .sva format and generates one components digest 212 and one properties digest 214 for the .sva format.

The components digest 212 and the properties digest 214 for a given format include all the data and information necessary for the run time module 204 to: analyze a first set of file data 215 for a file having a format that corresponds to the components digest 212; identify the semantic components included in the file data 215; determine which of these semantic components are related to operations supported by the operations digest 210; and generate an operations list 216 or combined operations list 218 describing the supported operations included in the first set of file data 215. The components digest 212 and properties digest 214 for a given format may also include all the data and information necessary for the run time module 204 to analyze an operations list 216 or combined operations list 218 and transform the sequence of operations included in the operations list 216 or combined operations list 218 to a second set of file data 215 that includes all the supported semantic components that were present in a first set of file data 215. In some implementations, the second format is the same as the first format. The functionality of the components digest 212 will be described in more detail below with reference to FIGS. 3A-3C and 7-14.

In some implementations, the run time module 204 is configured to determine the schema for a set of file data 215. The schema may be explicit or inferred. In some implementations, the run time module 204 may analyze a set of file data 215 to determine an explicit schema that describes the structure of the content. For example, the content may be a document and the run time module 204 analyzes the set of file data 215 to determine an explicit schema that describes the structure of the document. In this way the run time module 204 may determine an explicit schema for a set of file data 215. In other implementations, the run time module 204 may analyze a set of file data 215 and infer the schema based on the structure of the content. A person having ordinary skill in the art will recognize that there may be other ways for the run time module 204 to determine the schema for a set of file data 215.

In some implementations, the run time module 204 analyzes the input to determine a schema for the input. The schema may be explicit or inferred by the run time module 204. The run time module 204 determines a first file format for a set of file data 215 based at least in part on the schema. The run time module 204 may determine a components digest 212 based at least in part on the schema. The run time module 204 may determine a properties digest 214 based at least in part on the schema.

Figure 3A:
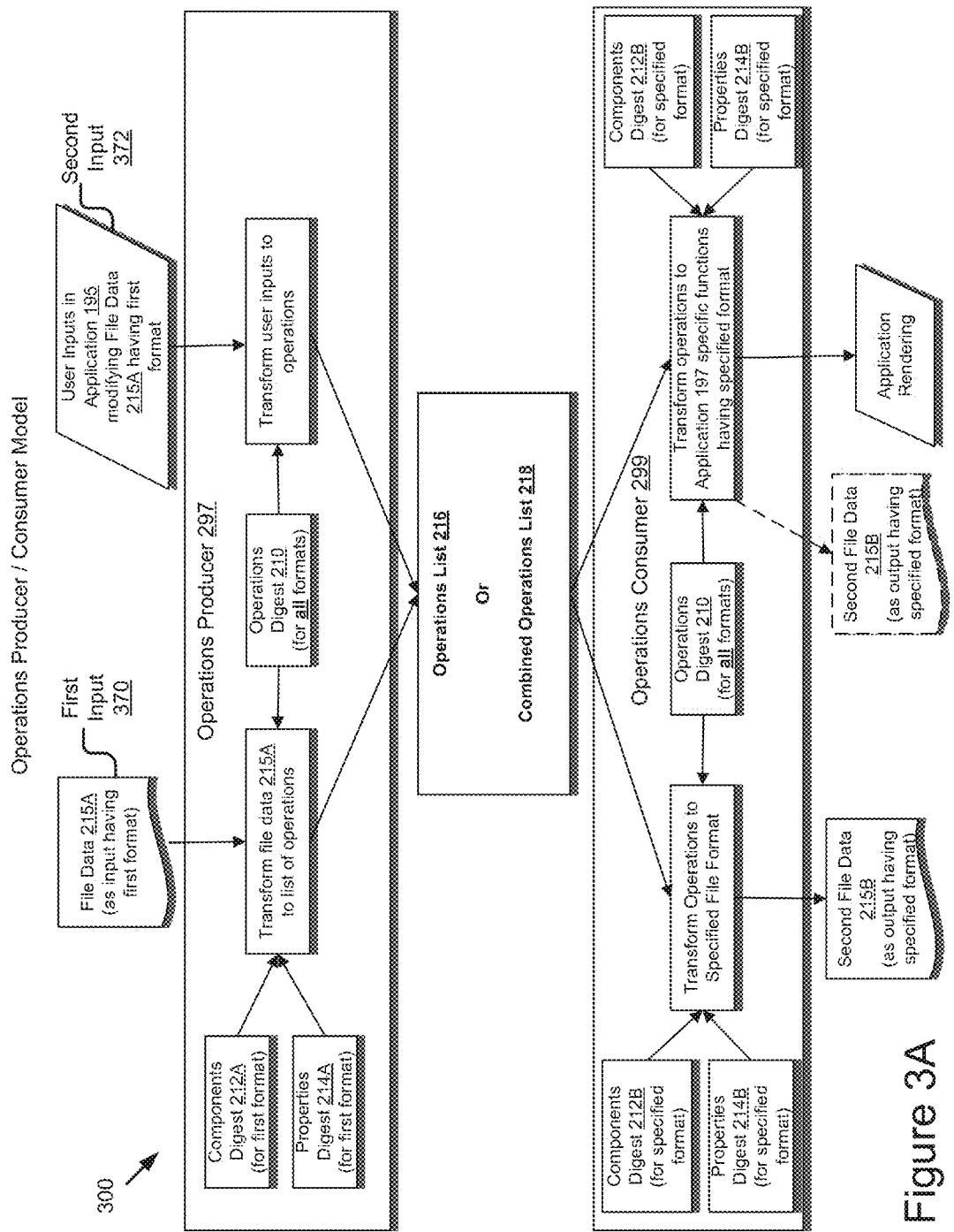
FIG. 3A illustrates a block diagram of some implementations of an example operations producer/consumer module for implementing the content module at run time.

Referring now to FIG. 3A, an example of the run time module 204 receiving an input (e.g., 370 or 372) having a first format and determining an output having a specified format which is semantically equivalent to the input. FIG. 3A is illustrated in accordance with at least one implementation described herein. FIG. 3A may be described as depicting an operations producer/consumer model 300 in accordance with one implementation.

FIG. 3A depicts an operations producer 297 and an operations consumer 299. The operations producer 297 and the operations consumer 299 are described in more detail below.

In some implementations, the operations producer 297 is a sub-module of the run time module 204 that receives an input and determines an operations list 216 or a combined operations list 218. The operations producer 297 may receive different inputs 370 or 372. The operations producer 297 may output an operations list 216 or a combined operations list 218.

A first input 370 which the operations producer 297 may receive is first file data 215A. The file data 215A is data describing a file having a first file format. The file described by the file data 215A may include any type of content. The content may include one or more operations. If the operations producer 297 receives the first input 370, then the output of the operations producer 297 is an operations list 216. The operations list 216 is data describing an ordered sequence of operations. The ordered sequence of operations which comprises the operations list 216 describes all supported operations present in the file data 215A received by the operations producer 297 as the first input 370.

In one implementation, the operations producer 297 receives the first input 370. The operations producer 297 may retrieve an operations digest 210 from a memory 237 describing all the operations supported by the content module 199. The operations producer 297 may analyze the file data 215A to determine which operations are present in the file data 215A. The operations producer 297 may determine which of these operations are supported by the content module 199 based on whether these operations are present in the operations digest 210. The operations producer 297 may determine which format is associated with the file data 215A. For example, the operations producer 297 may parse the file data 215A or analyze the file name to determine the format of the file data 215A. The operations producer 297 may utilize any other method known in the art for determining the format of the file data 215A. The operations producer 297 may determine which components digest 212A and which properties digest 214A to use based on the file format. For example, each file format has a specific components digest 212A and a specific properties digest 214A. The operations producer 297 may retrieve the appropriate components digest 212A and properties digest 214A from the memory 237 based at least in part on the file format determined for the file data 215A. The operations producer 297 may transform the supported operations present in the file data 215A to an operations list 216 based on the components digest 212A and the properties digest 214A. The ordered sequence of operations which comprise the operations list 216 describe all the supported operations present in the file data 215A received by the operations producer 297 as the first input 370.

A second input 372 which the operations producer 297 may receive is one or more user inputs in an application 195 modifying file data 215A having a first format. The file data 215A is similar to that described above for the first input 370, with the exception that a user has provided one or more inputs to the application 195 modifying the file data 215A. For example, the file data 215A describes a document and the application 195 is a word processor. The user provides one or more inputs to the application 195 associated with new operations for the file data 215. The new operations can be any operations such as adding text, moving paragraphs, etc. In this situation, the operations producer receives second input 372 and outputs a combined operations list 218. The combined operations list 218 describes all the operations present in the file data 215A before the file data was modified as well as the additional operations added to the file data 215A by the user inputs to the application 195.

In one implementation, the operations producer 297 receives the second input 372. The operations producer 297 may retrieve an operations digest 210 from a memory 237 describing all the operations supported by the content module 199. The operations producer 297 may analyze the file data 215A to determine which operations are present in the file data 215A. The operations producer 297 may determine which of these operations are supported by the content module 199 based on whether these operations are present in the operations digest 210. Similar to the description above for the first input 370, the operations producer 297 may determine which format is associated with the file data 215A; the operations producer 297 may further determine which components digest 212A and which properties digest 214A to use based on the file format. The operations producer 297 may retrieve the appropriate components digest 212A and properties digest 214A from the memory 237 based at least in part on the file format determined for the file data 215A. The operations producer 297 may transform the supported operations present in the file data 215A to a combined operations list 218 based on the components digest 212A and the properties digest 214A. The ordered sequence of operations which comprise the combined operations list 218 describe all the supported operations present in the file data 215A received by the operations producer 297 as the second input 372.

Accordingly, in some implementations the operations producer 297 receives an input that includes file data 215A, determines which operations included in the file data 215A are supported by the content module 199 based on an operations digest 210, and outputs a list of operations (e.g., operations list 216 or combined operations list 218) that describes all the supported operations present in the file data 215A based on a components digest 212A and a properties digest 214A that are specific to the format of the file data 215A. In some implementations, the operations list 216 or the combined operations list 218 are a lingua franca between the operations producer 297 and the operations consumer 299.

In some implementations, the operations consumer 299 is a sub-module of the run time module 204 that receives an input and determines an output. The operations consumer 299 may receive the operations list 216 or the combined operations list 218 as an input. The operations consumer 299 may have different output depending on which type of input 216 or 218 is received.

In one implementation, the operations consumer 299 receives an operations list 216 as an input. The operations consumer 299 may retrieve an operations digest 210 from a memory 237 describing all the operations supported by the content module 199. The operations producer 297 may analyze the operations list 216 to determine which operations are supported by the content module 199; in some implementations, the operations consumer 299 skips this step and assumes that the operations present in the operations list 216 are supported by the content module 199 since the input of the operations list 216 was received from the operations producer 297. The operations consumer 299 may determine a specified format for the operations list 216. The operations consumer 299 outputs data having a specified file format. In some implementations, a human user of the content module 199 provides an input describing the specified format. In other implementations, the specified format may be a predetermined configuration of the consumer module 199, or may be inferred by the content module 199 based on context data. The specified file format may be a format that is different from the first format of the file data 215A. In some implementations, the specified format is the same as the first format. The operations consumer 299 may determine which components digest 212B and which properties digest 214B to use based on the specified file format. The components digest 212B and the properties digest 214B are configured to generate an output that is semantically equivalent to the input to the operations producer 297. The operations consumer 299 may retrieve the appropriate components digest 212B and properties digest 214B from the memory 237 based at least in part on the specified file format. The operations consumer 299 may transform the supported operations present in the operations list 216 to second file data 215B having the specified format. The second file data 215B outputted from the operations consumer 299 is semantically equivalent to first file data 215A. The operations consumer 299 transforms the operations list 216 based on the components digest 212B and the properties digest 214B.

In one implementation, the operations consumer 299 receives a combined operations list 218 as an input. The operations consumer 299 may retrieve an operations digest 210 from a memory 237 describing all the operations supported by the content module 199. The operations producer 297 may analyze the combined operations list 218 to determine which operations are supported by the content module 199; in some implementations, the operations consumer 299 skips this step and assumes that the operations present in the combined operations list 218 are supported by the content module 199 since the input of the combined operations list 218 was received from the operations producer 297. The operations consumer 299 may determine a specified format for the combined operations list 218. In some implementations, the specified format is the same as the first format. The operations consumer 299 may determine which components digest 212B and which properties digest 214B to use based on the specified file format. The components digest 212B and the properties digest 214B are configured to generate an output that is semantically equivalent to the input to the operations producer 297. The operations consumer 299 may retrieve the components digest 212B and properties digest 214B from the memory 237 based at least in part on the specified file format. The operations consumer 299 may transform the supported operations present in the combined operations list 218 to specific functions of a second application 197 having the specified format. The functions specific to the second application 197 may then be rendered on a display. Upon being rendered on the display, the output will be semantically equivalent to how the first file data would have appeared had it been rendered on a display. Optionally, the functions may also be stored as second file data 215B having the specified format. The second file data 215B outputted from the operations consumer 299 is semantically equivalent to first file data 215A. In some implementations, the operations consumer 299 transforms the operations in the combined operations list 218 to operations specific to a first application 195 that is the same as the application 195 in the second input 372. The operations consumer 299 transforms the combined operations list 218 based on the components digest 212B and the properties digest 214B.

In some implementations, the operations producer 297 outputs an operations list 216 or a combined operations list 218 for a first application 195. The output of the operations producer 297 may be the input for an operations consumer 299 that is specific to a second application 197 that is different from the first application. For example, the first application 195 is Microsoft Word and the second application is Apple Pages.

Figure 3B:
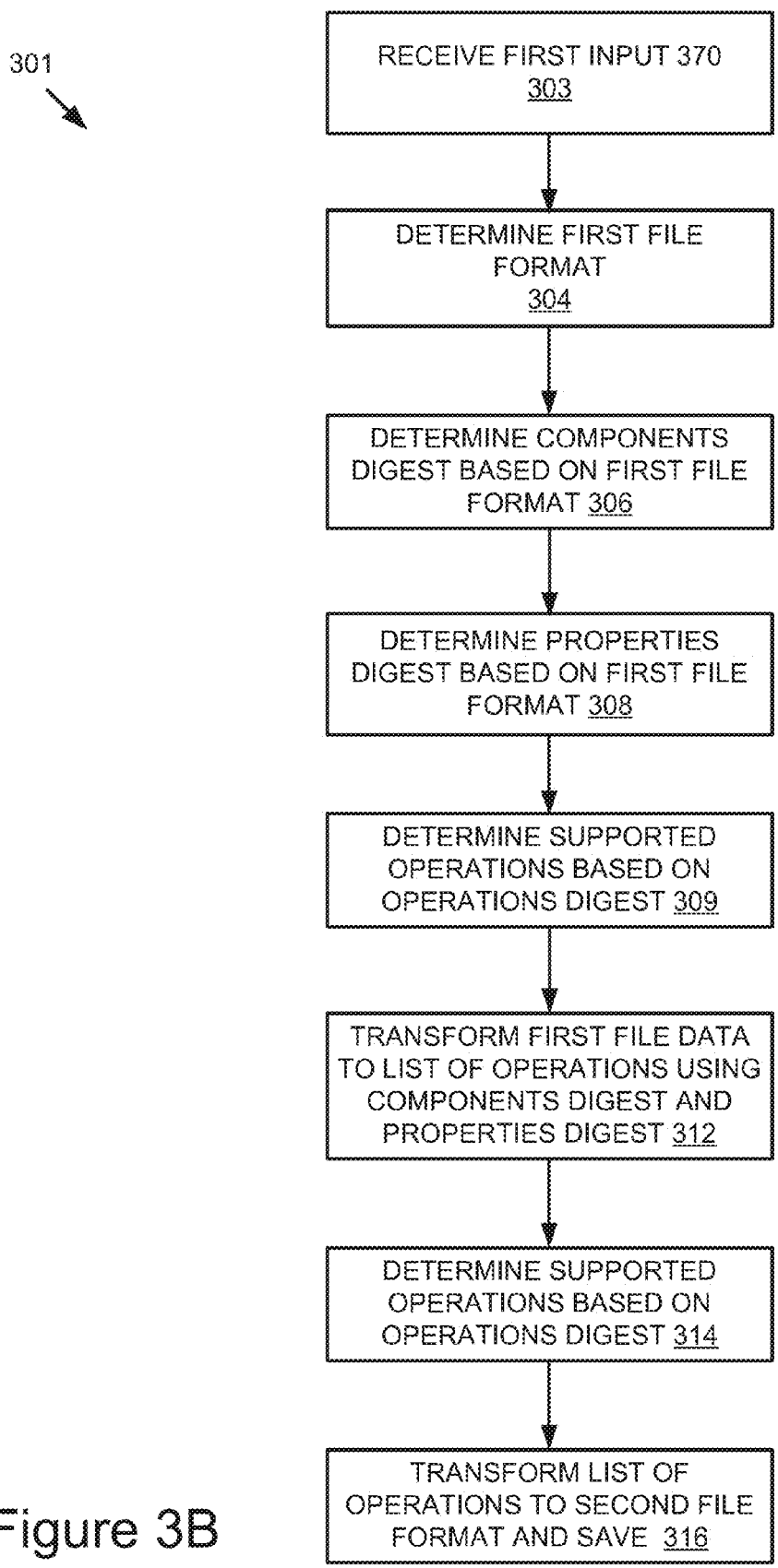
FIGS. 3B and 3C illustrate example methods for implementing the content module at run time to transform inputs.

Referring now to FIG. 3B, an example of a method 301 for receiving, as an input, a first set of file data 215A having a first format and outputting a second set of file data 215B having a second format is described, in accordance with at least one embodiment described herein. The first format and the second format may be the same. The method 301 is described with respect to FIGS. 1-3A. Although illustrated as discrete blocks, various blocks may be divided into additional blocks, combined into fewer blocks, or eliminated, depending on the desired implementation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In the illustrated implementation of FIG. 3B, the method 301 may include a run time module 204 receiving 303 the first input 370 described above with reference to FIG. 3A. The first input 370 may include a first set of file data 215A having a first file format. The file data 215A may describe any content such as a document, spreadsheet, webpage, etc. The run time module 204 may determine 304 a first file format for the file data 215A included in the first input 370. The run time module 204 may determine 306 a first components digest 212A based on the first file format. The run time module 204 may determine 308 a first properties digest 214A based on the first file format. The run time module 204 may determine 309 which operations are supported by the content module 199 based on an operations digest 210. The run time module 204 may transform 312 the first file data 215A to a list of operations using the first components digest 212A and the first properties digest 214A. The list of operations may be an operations list 216. In some implementations, the list of operations may be a combined operations list 218. The run time module 204 may determine 314 which operations included in the list of operations are supported by the content module 199 based on the operations digest 314. For example, the run time module 204 determines that operations excluded from the operations digest 210 are not supported by the content module 199. The run time module 204 may transform 316 the list of operations to a second set of file data 215B having a second file format. The run time module 204 may save the data in a memory or communicate with the user interface module 208 to cause the content associated with the second set of file data 215B to be rendered.

Figure 3C:
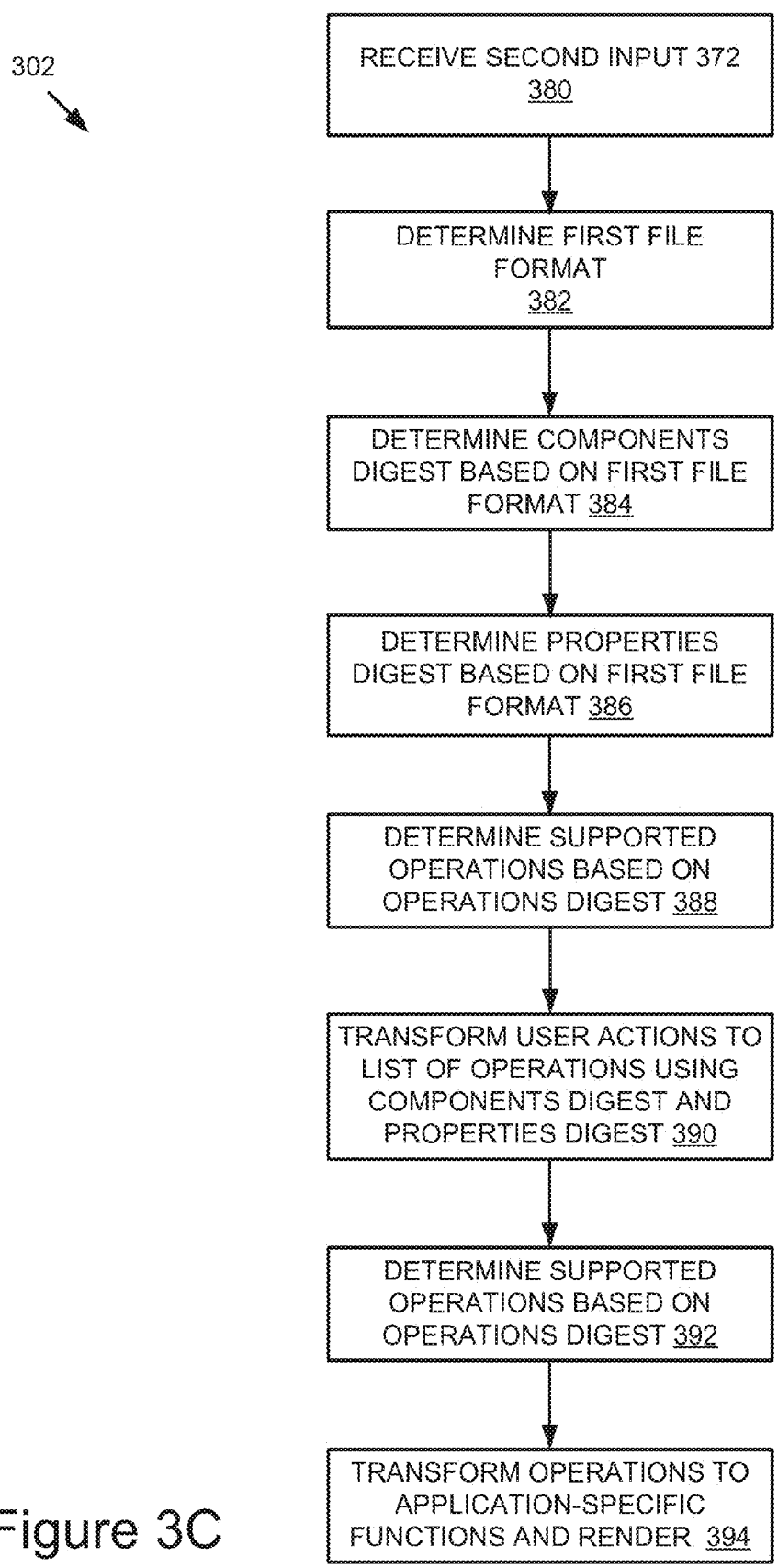

Referring now to FIG. 3C, an example of a method 302 for receiving, as an input, user inputs in an application 195 modifying a first set of file data 215A having a first format and outputting a second set of file data 215B having a second format is described, in accordance with at least one embodiment described herein. The first format and the second format may be the same. The method 302 is described with respect to FIGS. 1-3A. Although illustrated as discrete blocks, various blocks may be divided into additional blocks, combined into fewer blocks, or eliminated, depending on the desired implementation.

In the illustrated implementation of FIG. 3C, the method 302 may include a run time module 204 receiving 380 the second input 372 described above with reference to FIG. 3A. The second input 372 may include a first set of file data 215A having a first file format. The file data 215A may describe any content such as a document, spreadsheet, webpage, etc. The run time module 204 may determine 382 a first file format for the file data 215A included in the first input 370. The run time module 204 may determine 384 a first components digest 212A based on the first file format. The run time module 204 may determine 386 a first properties digest 214A based on the first file format. The run time module 204 may determine 388 which operations are supported by the content module 199 based on an operations digest 210. The run time module 204 may transform 390 the first file data 215A to a list of operations using the first components digest 212A and the first properties digest 214A. The list of operations may be an operations list 216 or a combined operations list 218. The run time module 204 may determine 392 which operations included in the list of operations are supported by the content module 199 based on the operations digest 210. The run time module 204 may transform 394 the list of operations to a set of application-specific functions. The run time module 204 may transform 394 the list of operations to a second set of file data 215B having a second file format. The run time module 204 may save the data in a memory. The run time module 204 may save the data in a memory or communicate with the user interface module 208 to cause the content associated with the second set of file data 215B to be rendered.

In some implementations, the run time module 204 is configured to determine the schema for the first input 370. The schema may be explicit or inferred. In some implementations, the run time module 204 may analyze the data included in the first input 370 to determine an explicit schema that describes the structure of the content included in the first input 370. For example, the content may be a document and the run time module 204 analyzes the first input 370 to determine an explicit schema that describes the structure of the document. In this way the run time module 204 may determine an explicit schema for a set of file data 215. In other implementations, the run time module 204 may analyze the first input 370 and infer the schema based on the structure of the content. A person having ordinary skill in the art will recognize that there may be other ways for the run time module 204 to determine the schema for the first input 370.

In some implementations, the run time module 204 analyzes the first input 370 to determine a schema for the first input 370. The schema may be explicit or inferred by the run time module 204. The run time module 204 determines 304 a first file format for the first input 370 based at least in part on the schema. The run time module 204 may determine 306 a components digest 212 based at least in part on the schema. The run time module 204 may determine 308 a properties digest 214 based at least in part on the schema.

Figure 4:
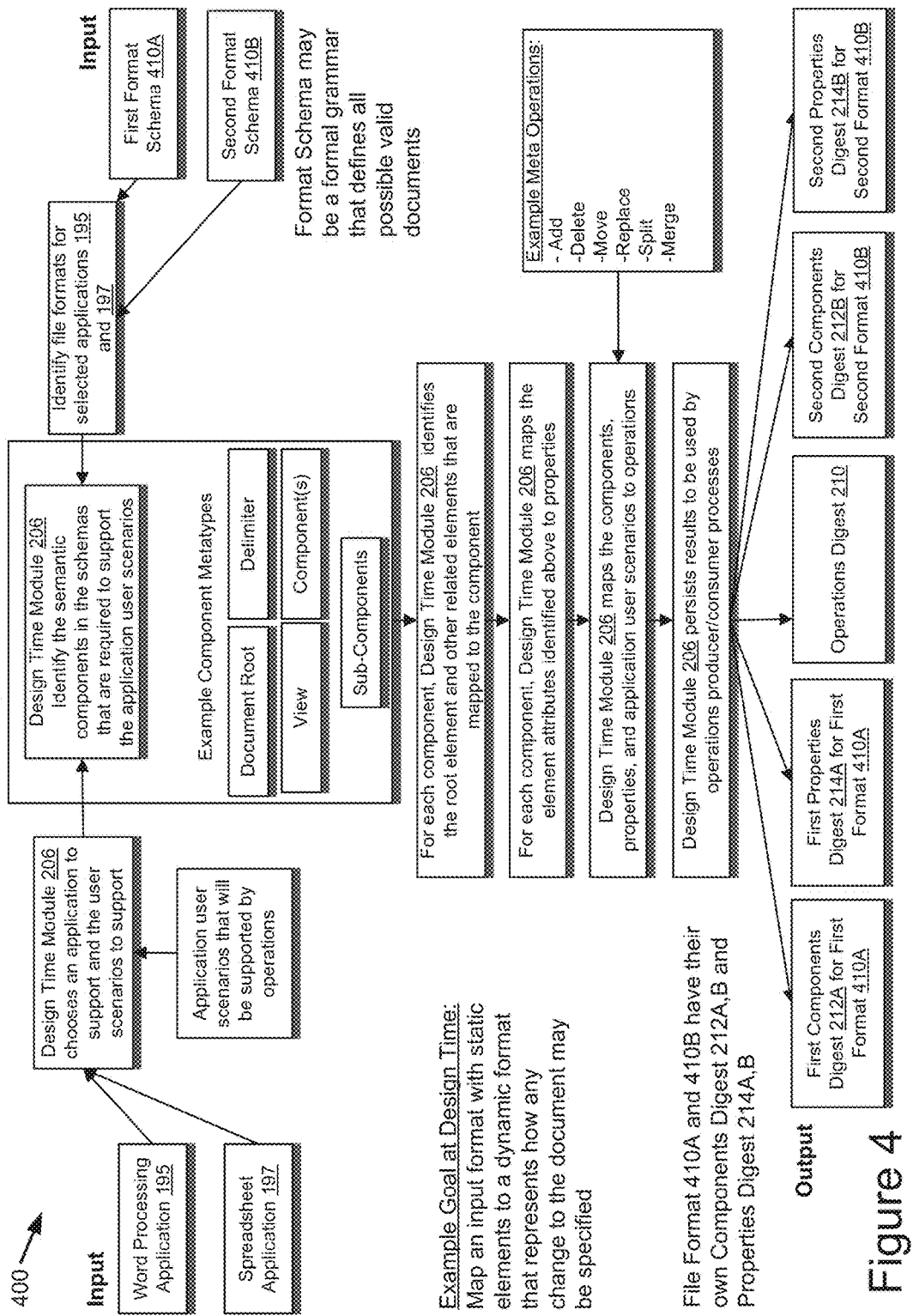
FIG. 4 illustrates a block diagram of some implementations of an example of a design time module to build digests for different formats.

Referring now to FIG. 4, an example graphical data flow model 400 of the design time module 206 creating an operations digest 210, two components digests 212A, 212B, and two properties digests 214A, 214B is depicted.

On the left- and right-hand side of FIG. 4 are depicted two different types of inputs for the design time module 206. On the left-hand side of FIG. 4 is a first application 195 and a second application 197. For the purpose of example, the first application 195 may be a word processing application 195 and the second application 197 may be a spreadsheet application 197. The applications 195, 197 may be any type of application.

On the right-hand side of FIG. 4 is a first format 410A schema and a second format 410B schema. The first format 410A schema corresponds to the first application 195 and the second format schema 410B corresponds to the second application 197, respectively. In other words, in this example the word processing application 195 has the first format 410A schema and the spreadsheet application 197 has the second format 410B schema.

Looking again to the left-hand side of FIG. 4, the design time module 206 may determine which applications to support. For example, a user of the content module 199 provides an input to the design time module 206 specifying which applications to support. The design time module 206 may also determine which user scenarios to support. For example, a user of the content module 199 provides an input to the design time module 206 describing which user actions in an application should be supported by the content module 199. A user scenario may be any user action with an application.

Looking again to the right-hand side of FIG. 4, the design time module 206 may identify which file formats are supported by the input applications 195, 197. The design time module 206 may make this determination based on the first format schema 410A and the second format schema 410B.

Previously the design time module 206 determined which user scenarios to support. The design time module 206 now identifies the semantic components in the schemas that are required to support these user scenarios. For example, assume one of the user scenarios supported is moving text in the word processing application 195. The schema which corresponds to the word processing application 195 is the first format schema 410A. The design time module 206 analyzes the first format schema 410A to identify the semantic components necessary to support moving text in a document of the word processing application 195.

In some implementations, the design time module 206 analyzes a schema to identify a pattern of operations in the schema necessary to accomplish a supported user scenario. This process may be repeated for each supported user scenario.

The design time module 206 may analyze the schemas 410A, 410B associated with supported applications 195, 197 to determine component metatypes for the supported user scenarios. For example, the design time module 206 determines one or more of a document root, delimiter, view, component(s), sub-component(s), etc.

The design time module 206 may analyze the first schema 410A to determine data and information necessary to build a first components digest 212A and a first properties digest 214A. The first components digest 212A and the first properties digest 214A are associated with the first format 410A for the first application 195. The design time module 206 may also analyze the second schema 410B to determine data and information necessary to build a second components digest 212B and a second properties digest 214B for the second format 410B associated with the second application 197. This analysis is described in more detail in the next paragraph.

For each component, the design time module 206 may identify the root element and other related element attributes that are mapped to the component. For each component, the design time module 206 may map the element attributes identified above to the properties of the component. The design time module 206 maps the components, properties, and application user scenarios to the operations that describe the components, properties, and application user scenarios. The result of this mapping is that the design time module 206 builds the operations digest 210, components digests 212A, 212B, and properties digests 214A, 214B. The design time module 206 persists the digests 210, 212A, 212B, 214A, 215B for subsequent use by the run time module 204 at run time.

Figure 5:
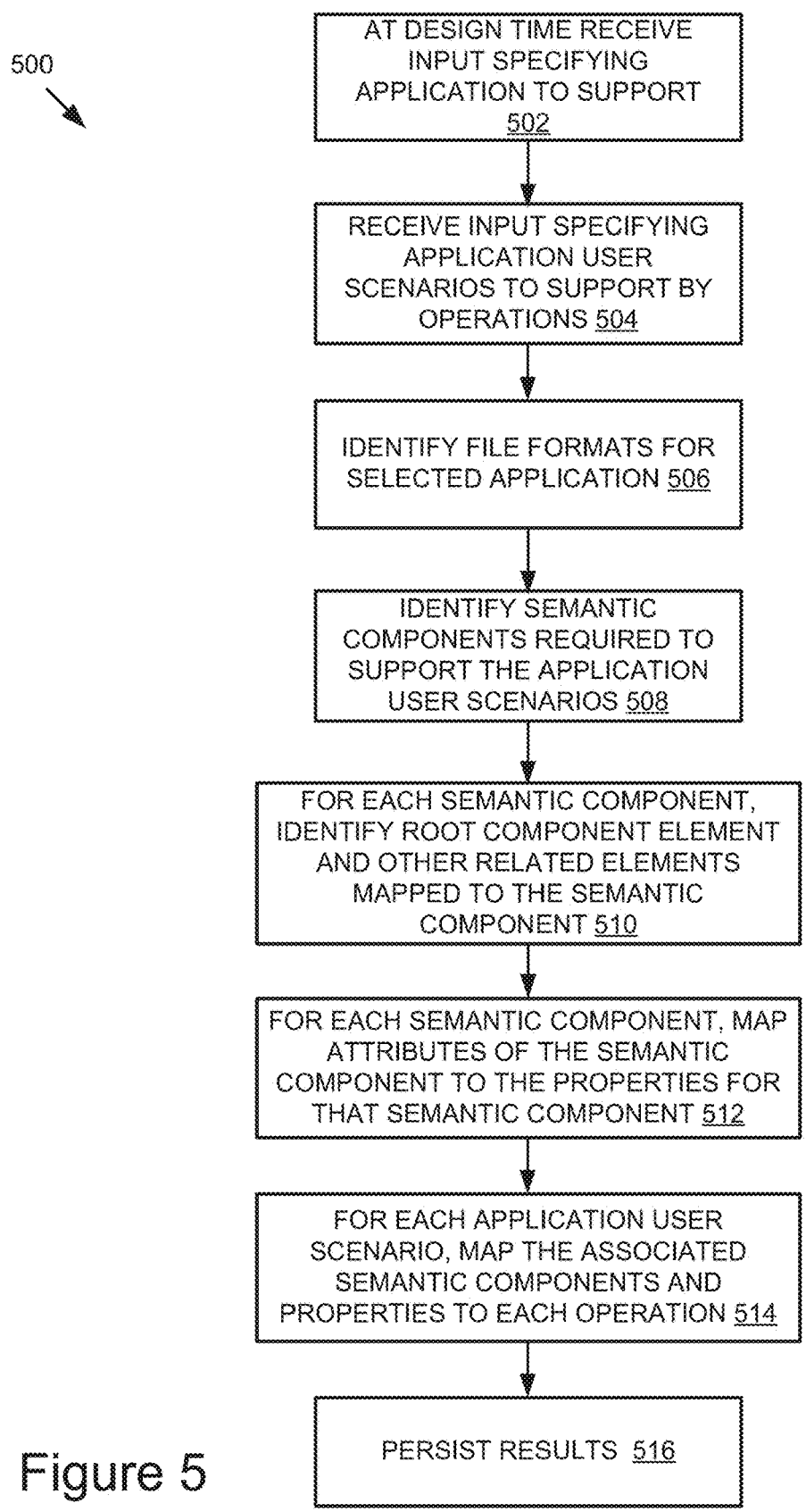
FIG. 5 illustrates an example method for implementing the content module at design time to build digests.

Referring now to FIG. 5, an example of a method 500 for the design time module 206 building the operations digest 210, components digest 212, and properties digest 214 is described, in accordance with at least one embodiment described herein.

The design time module 206 receives 502 an input specifying an application to support. The design time module 206 receives 504 an input specifying which application user scenarios to support. The design time module 206 identifies 506 file formats for the selected applications. The design time module 206 identifies 508 semantic components required to support the application user scenarios specified at step 504. For example, if one of the supported user application scenarios is "user adding text," then the semantic components required to support this user application scenario might be: paragraph and text characters.

For each semantic component, the design time module 206 identifies 510 the root component element and other related elements mapped to the semantic component. In some implementations, each semantic component is associated with one or more adjacent XML elements that form a semantic unit. Each semantic unit may have a root component element. For each semantic component, the design time module 206 identifies the root component element as well as the other adjacent XML elements that formed the semantic unit associated with that semantic component. For example, in .ODF the component element "table" may be associated with <table:table>. The design time module 206 may determine the root component element and other related elements for "table."

In some implementations, there may be three methods used by the design time module 206 to identify 510 a root component element of a semantic component. The first way is referred to as the "empirical method." For example, the empirical method includes: the design time module 206 opens an application that supports the semantic component and the format of the semantic component; the design time module 206 opens a file format document using the application; the design time module 206 provides an input to the application to add a semantic component to the file format document of the application; the design time module 206 saves the file format document; the design time module 206 analyzes the file format document to determine the differences; and the design time module 206 determines the root component element for the semantic component based on the differences.

The second method is referred to as the "explicit method." For example, the explicit method includes: the design time module 206 accesses the specification of the format associated with the semantic component; and the design time module 206 analyzes the specification to determine the root component element for the semantic component.

The third way is a mix of the empirical method and the explicit method; this method is referred to as the "composite method."

In some implementations, the design time module 206 builds the components digest 212 by implementing one or more aspects of steps 508 and 510. In some implementations, an intermediate step is to determine the operations necessary in each supported application to achieve each of the supported user action scenarios. The design time module 206 may then map each supported user action scenario to the one or more operations necessary to achieve that user action scenario.

As described above for step 508, each supported application user scenario is mapped to one or more semantic components necessary to achieve that user application scenario. For each semantic component, the design time module 206 maps 512 the attributes of the semantic component to the properties 512 of the semantic component.

In some implementations, the design time module 206 maps 512 the attributes of the semantic component to the properties 512 of the semantic component using methods similar to those described above with reference to step 510. When applying the empirical method, a component is not added to the file format document. Instead, the design time module 206 alters each possible property for the semantic component by providing inputs to the application and determines the changes. In this way the design time module 206 may determine the properties for the semantic component and how the properties are mapped to the semantic component.

In some implementations, each application user scenario is mapped to one or more semantic components necessary to achieve that user application scenario. In this way each supported user application scenario is associated with the one or more semantic components necessary to achieve the user application scenario. Since each semantic component is mapped to one or more properties, each supported user application scenario is associated with the one or more semantic components and the properties that are mapped to each of these semantic components.

In some implementations, the design time module 206 builds the properties digest 214 by implementing one or more aspects of step 512.

Each supported application user scenario is associated with the one or more operations necessary to achieve the supported application user scenario. Each supported user application scenario is associated with one or more semantic components and one or more properties mapped to these semantic components. For each supported application user scenario, the design time module 206 maps 514 the semantic components associated with the application user scenario and the properties associated with the application user scenario to each operation necessary to achieve that application user scenario. The design time module 206 persists 516 the results of this mapping.

Figure 6:
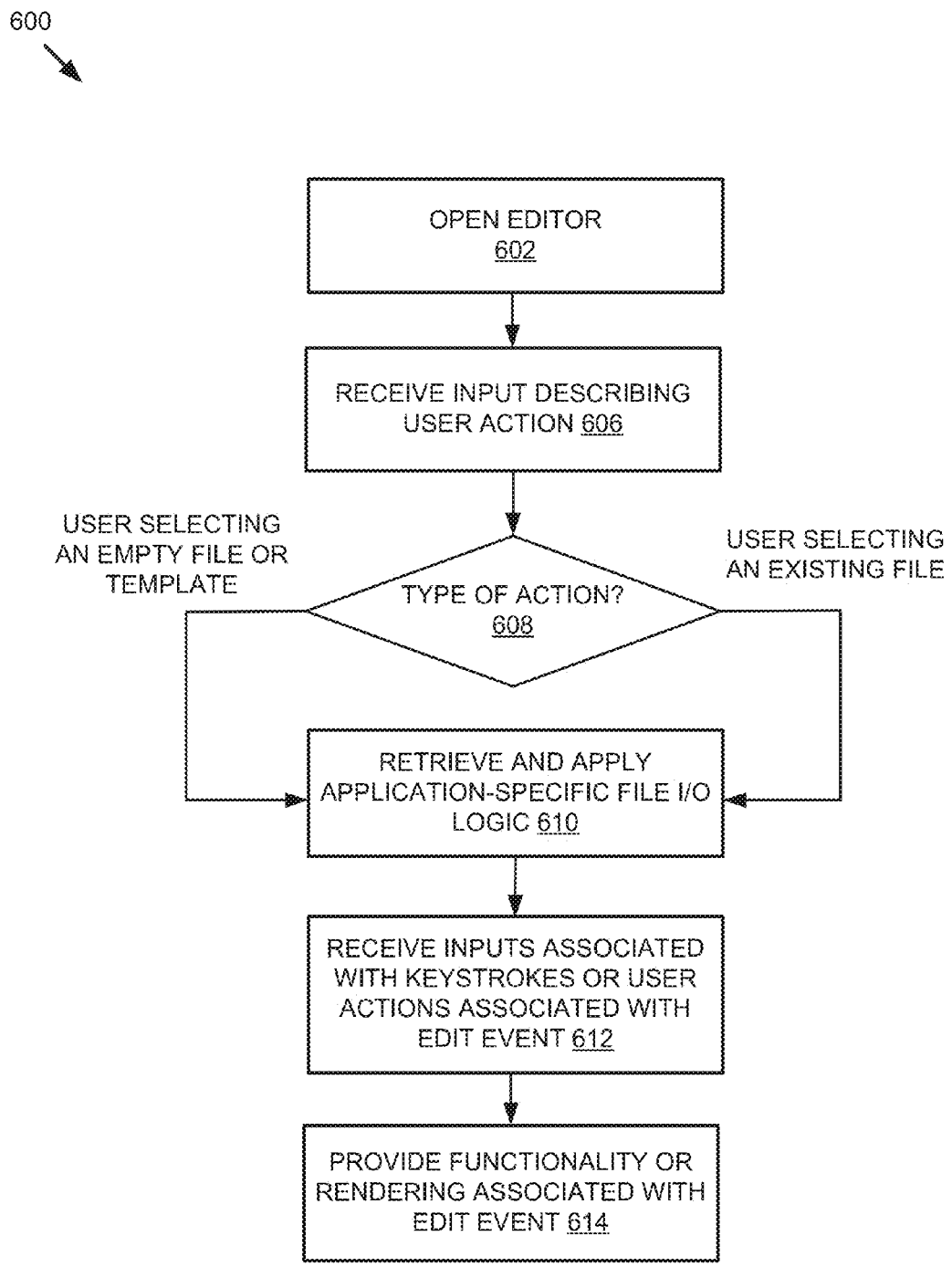
FIG. 6 illustrates an example prior art method for transforming data.

Referring now to FIG. 6, a prior art method 600 for an application translating an edit event at run time is described. In the prior art method 600 all knowledge of how the format schema relates to user actions and functionality in an application is contained solely within the application itself.

A user provides an input requesting the application to open an editor. The application opens 602 the editor. The user provides an input describing a user action. The application receives 606 the input describing the user action. The application determines 608 what type of action is associated with the user input. The application retrieves and applies 610 an application-specific file input/output logic. The user provides an input such as keystrokes to create a document or any other input to edit a document in the editor. This may be described as an edit event. The application receives 612 the user inputs associated with the edit event. The application 614 provides functionality or rendering appropriate for the edit event.

Figure 7:
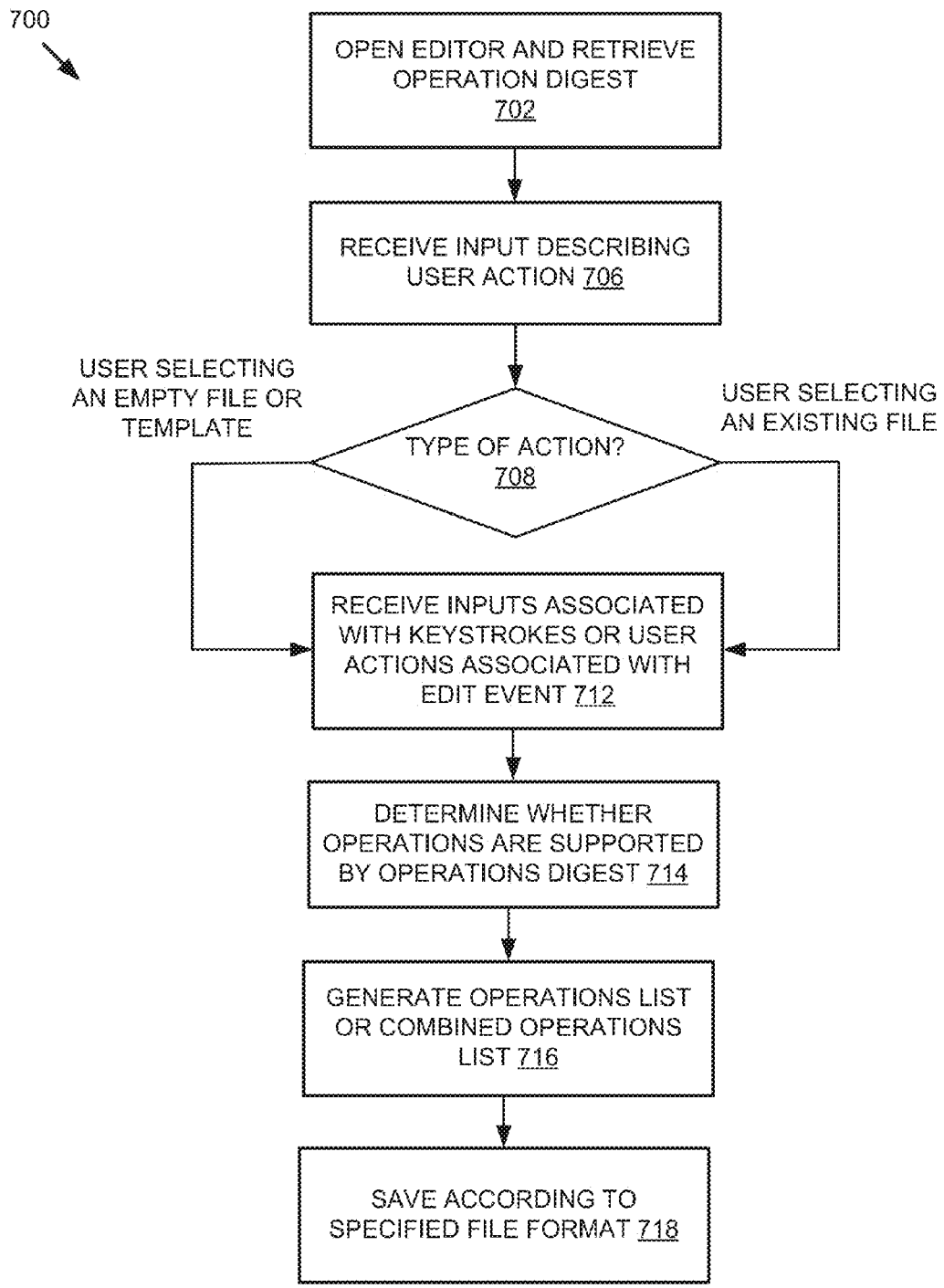
FIGS. 7-12 illustrate example methods for implementing the content module to transform data and user inputs.

Referring now to FIG. 7, an example of a method 700 for the content module 199 translating an edit event for content at run time is described, in accordance with at least one embodiment described herein. Method 700 concerns a method for a single user to manage content using the content module 199. In the method 700 all knowledge of how the format schema relates to the user action scenarios and functionality in the application is contained within the operations digest 210 of the content module 199.

A user provides an input requesting the application to open an editor. The application opens 702 the editor and the content module 199 retrieves an operations digest 210. The user provides an input describing a user action. The user may be creating new content or editing previously created content. For example, the content is a document and the user may be creating a new document or editing a previously created document. In some implementations, the content is a template.

The content module 199 receives 706 the input describing the user action. The content module 199 determines 708 what type of action is associated with the user input. For example, the content module 199 determines 708 whether the user is creating new content or editing previously created content.

The content module 199 may also determine a schema for the content. The schema may be explicit or inferred by the content module 199. The content module 199 may determine a first format for the content based on the schema. The content module 199 may further determine a first components digest 212A and a first properties digest 214A based on the schema or the format.

The user provides an input such as keystrokes to create content or any other input to edit previously created content in the editor. This may be described as an edit event. The content module 199 receives 712 the user inputs associated with the edit event. The user inputs may be associated with one or more operations. The content module 199 determines which operations are associated with the user inputs using the first components digest 212A and the first properties digest 214A. The content module 199 determines 714 whether the operations are supported by the operations digest 210. For example, the content module 199 maps the input to an operation in the operations digest 210 to determine the operation represented by the input. The content module 199 uses the operations associated with the user inputs to generate 716 a list of operations. The list of operations may be a combined operations list 218 or an operations list 216.

The content module 199 may determine a specified format. The specified format may be the same as the first format or different from the first format. In some implementations, the user provides an input describing the specified format. For example, the user requests that the content be saved according to the specified format. If the specified format is different than the first format, then the content module 199 may determine a second components digest 212B and a second properties digest 214B based on the specified format. The content module 199 may transform the operations in the list of operations to file data 215 having the specified format. The content module 199 may save 718 the file data 215 for the content having a specified file format.

Figure 8A:
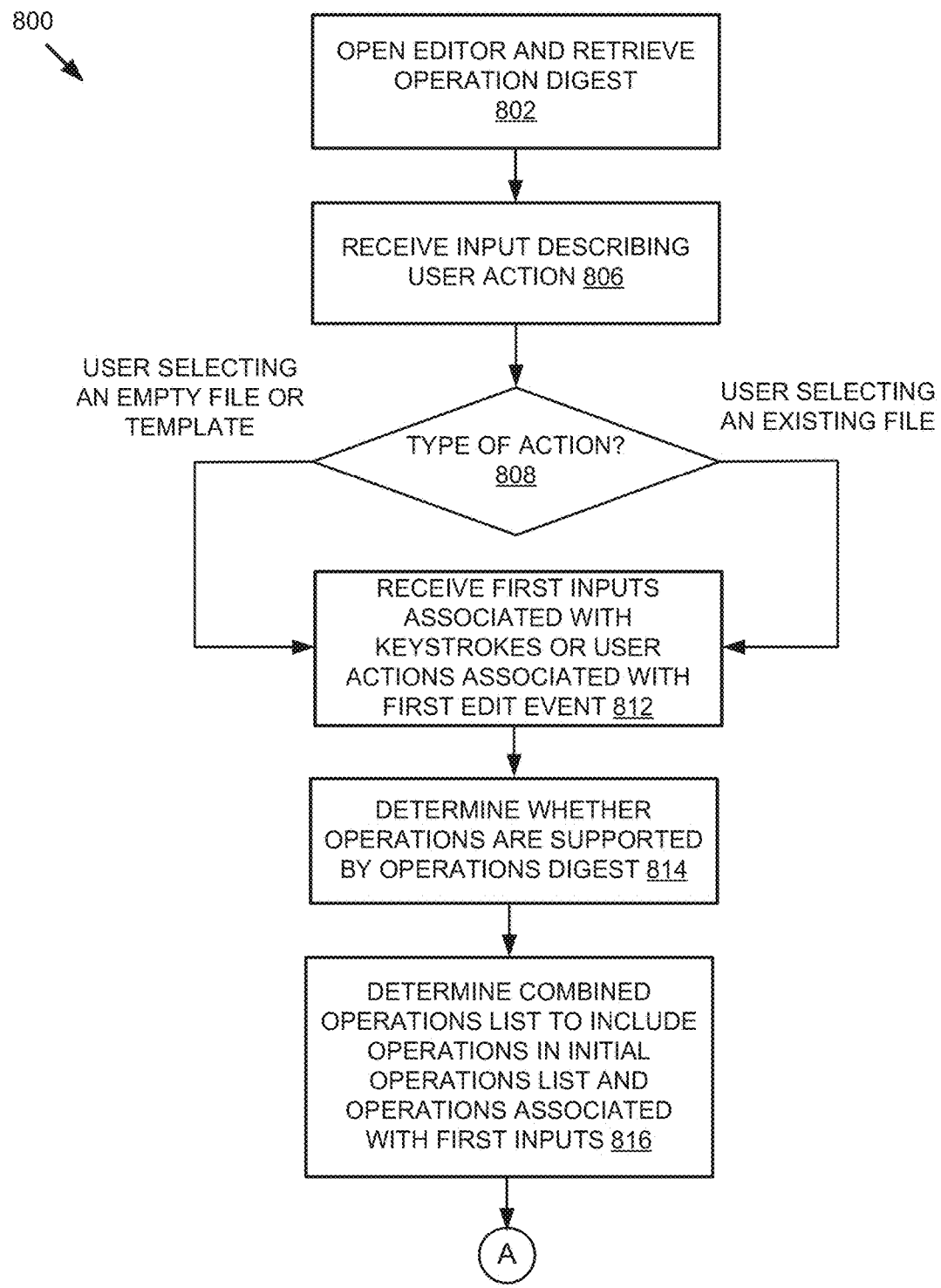

Referring now to FIG. 8A, an example of a method 800 for the content module 199 to translate an edit event for content at run time is described, in accordance with at least one embodiment described herein. Method 800 concerns a method for one or more users to synchronously manage content using the content module 199. In the method 800 all knowledge of how the format schema relates to the user action scenarios and functionality in the application is contained within the operations digest 210 of the content module 199.

A first user provides an input requesting the application to open an editor. The application opens 802 the editor and the content module 199 retrieves an operations digest 210. The first user provides an input describing a user action. The first user may be creating new content or editing previously created content. The first user may be collaborating on the content with a second user. For example, the content is a document and the first user and the second user may be collaborating to create a new document or edit a previously created document. In some implementations, the content is a template.

The content module 199 receives 806 the input describing the user action. The content module 199 determines 808 what type of action is associated with the user input. For example, the content module 199 determines 808 whether the user is creating new content or editing previously created content.

In some implementations, the content module 199 may also determine a schema for the content. The schema may be explicit or inferred by the content module 199. The content module 199 may determine a first format for the content based on the schema. The content module 199 may further determine a first components digest 212A and a first properties digest 214A based on the schema or the format. The content module 199 may determine an initial operations list 216 for the content. The initial operations list 216 may describe the state of the content prior to the content being edited or modified by the first user or the second user.

The first user provides an input such as keystrokes to create content or any other input to edit previously created content in the editor. The second user may provide additional inputs modifying the content. This may be described as a first edit event. The content module 199 receives 812 the user inputs associated with the first edit event. The user inputs may be associated with one or more operations. The content module 199 determines which operations are associated with the user inputs using the first components digest 212A and the first properties digest 214A. The content module 199 determines 814 whether the operations are supported by the operations digest 210. For example, the content module 199 maps the input to an operation in the operations digest 210 to determine the operation represented by the input. The content module 199 uses the operations associated with the user inputs to generate 816 a first combined operations list 218A.

In some implementations, the first combined operations list 218A includes operations that are synchronized based on the order in which the inputs of the first user and the second user were provided. For example, the first user provides one or more inputs to the content module 199 that are stored in a first user operations list associated with the first user. The second user provides one or more inputs to the content module 199 that are stored in the second user operations list associated with the second user. The content module 199 determines 816 the first combined operations list 218A by merging the first user operations list and the second user operations list. The content module 199 may merge the operations lists by sequencing the operations from the first user operations list and the second user operations list in the order that each operation was provided by the first user and the second user. The first combined operations list 218A may include operations in the initial operations list 216 and operations associated with the first inputs from the first user and the second user.

Figure 8B:
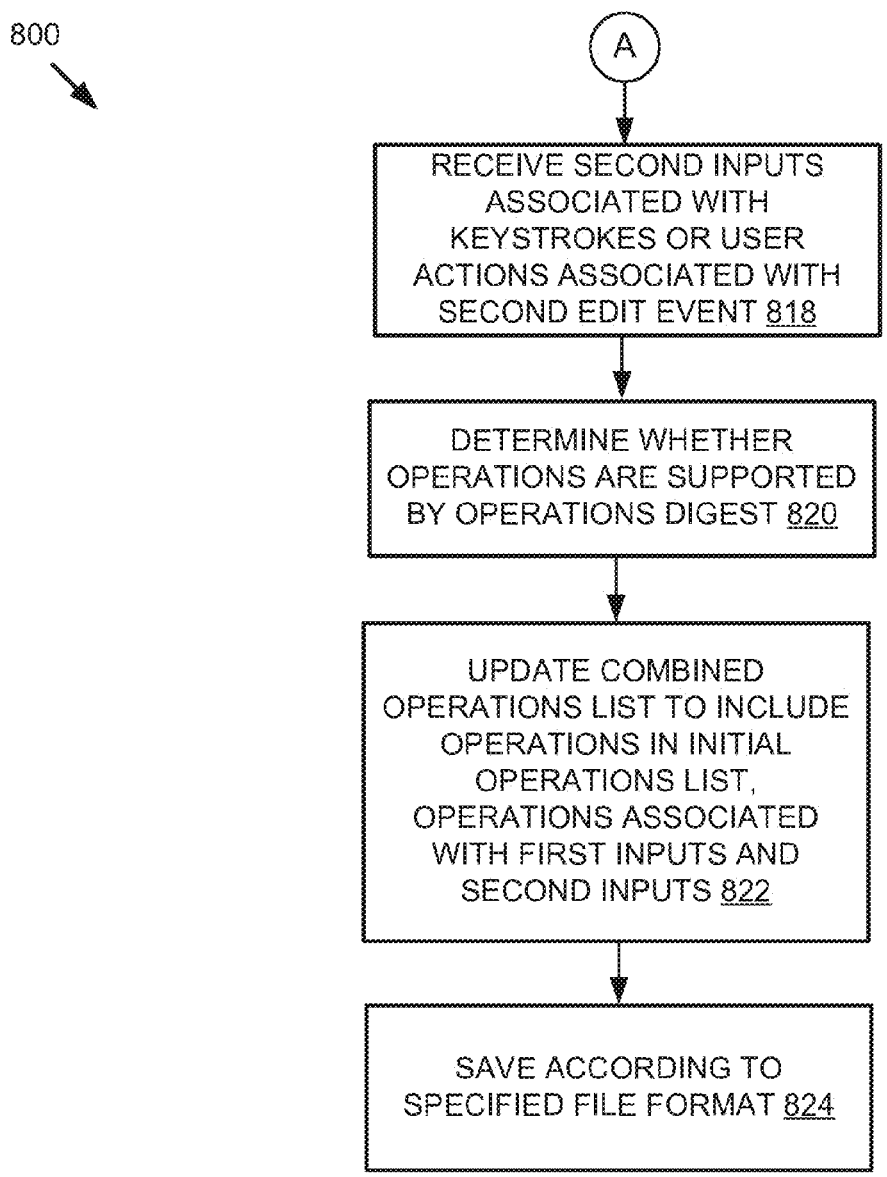

Referring now to FIG. 8B, the first user provides an input such as keystrokes to create content or any other input to edit previously created content in the editor. The second user may provide additional inputs modifying the content. This may be described as a second edit event. The content module 199 receives 818 the user inputs associated with the second edit event. The user inputs may be associated with one or more operations. The content module 199 determines which operations are associated with the user inputs using the first components digest 212A and the first properties digest 214A. The content module 199 determines 820 whether the operations are supported by the operations digest 210. For example, the content module 199 maps the input to an operation in the operations digest 210 to determine the operation represented by the input. The content module 199 uses the operations associated with the user inputs to generate 822 a second combined operations list 218B.

In some implementations, the content module 199 may generate 822 the second combined operations list 218B by merging the operations lists of the first user and the second user. The second combined operations list 218B may include operations that are synchronized based on the order in which the inputs of the first user and the second user were provided. For example, the first user provides one or more second inputs to the content module 199 that are stored in a first user operations list associated with the first user. The second user may provide one or more second inputs to the content module 199 that are stored in the second user operations list associated with the second user. The content module 199 determines 818 the second combined operations list 218B by merging the first user operations list (for the second inputs) and the second user operations list (for the second inputs). The content module 199 may merge the operations lists by sequencing the operations from the first user operations list (for the second inputs) and the second user operations list (for the second inputs) in the order that each operation was provided by the first user and the second user. The second combined operations list 218B may include operations in the initial operations list 216, the first combined operations list 218A and operations associated with the second inputs from the first user and the second user. Each of the operations included in the second combined operations list 218B may be sequenced as described based on the order in which they were provided.

The content module 199 may determine a specified format. The specified format may be the same as the first format or different from the first format. In some implementations, the user provides an input describing the specified format. For example, the user requests that the content be saved according to the specified format. The content module 199 may transform the operations in the second combined operations list 218B to file data 215 having the specified format. The content module 199 may save 824 the file data 215 for the content having a specified file format.

Figure 9:
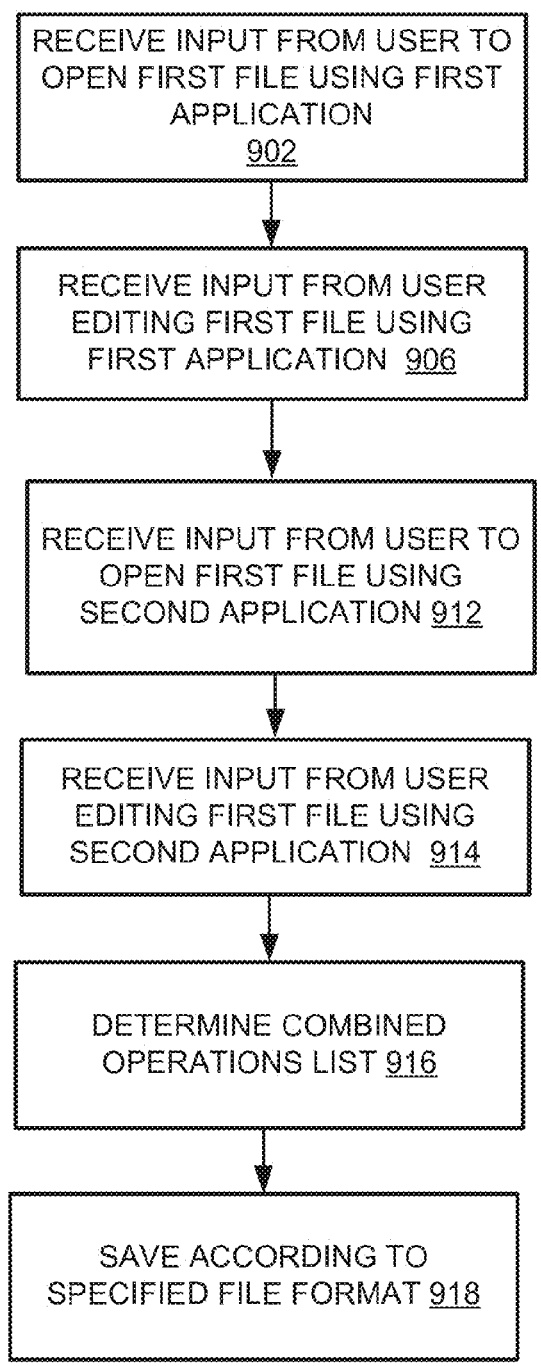

Referring now to FIG. 9, an example of a method 900 for the content module 199 to translate an edit event for content at run time among two or more applications used by one user is described, in accordance with at least one embodiment described herein. Method 900 concerns a method for a user to manage content among two or more applications using the content module 199. In the method 900 all knowledge of how the format schema relates to the user action scenarios and functionality in the application is contained within the operations digest 210 of the content module 199.

A user provides an input requesting a first application to open a first file. The first application may have a first schema and a first format. The content module 199 may determine the first schema. The first schema may be explicit or inferred by the content module 199. The content module 199 may determine the first format. The content module 199 may determine the first format based on the first schema.

The content module 199 receives 902 the input requesting that the first application open the first file. The user provides an input to the first application editing the content of the first file. The content module 199 receives 906 the input editing the content of the first file. The operations associated with the inputs to the first application editing the content of the first file may be saved to a first operations list 216A.

The user provides an input to a second application requesting that the second application open the first file. The first application may have a second schema and a second format. The content module 199 may determine the second schema. The second schema may be explicit or inferred by the content module 199. The content module 199 may determine the second format. The content module 199 may determine the second format based on the second schema. The first format and the second format may be the same format.

The content module 199 receives 912 the input from the user requesting that the second application open the first file. The user provides an input to the second application editing the content of the first file. The content module 199 receives 914 the input editing the content of the first file. The operations associated with the inputs to the second application editing the content of the first file may be saved to a second operations list 216B.

The content module 199 determines 916A combined operations list 218. The content module 199 may determine the combined operations list 218 by merging the first operations list 216A and the second operations list 216B.

The content module 199 may transform the operations in the second combined operations list 218B to file data 215 having a specified format. The content module 199 may save 918 the file data 215 for the content having a specified file format.

Figure 10:
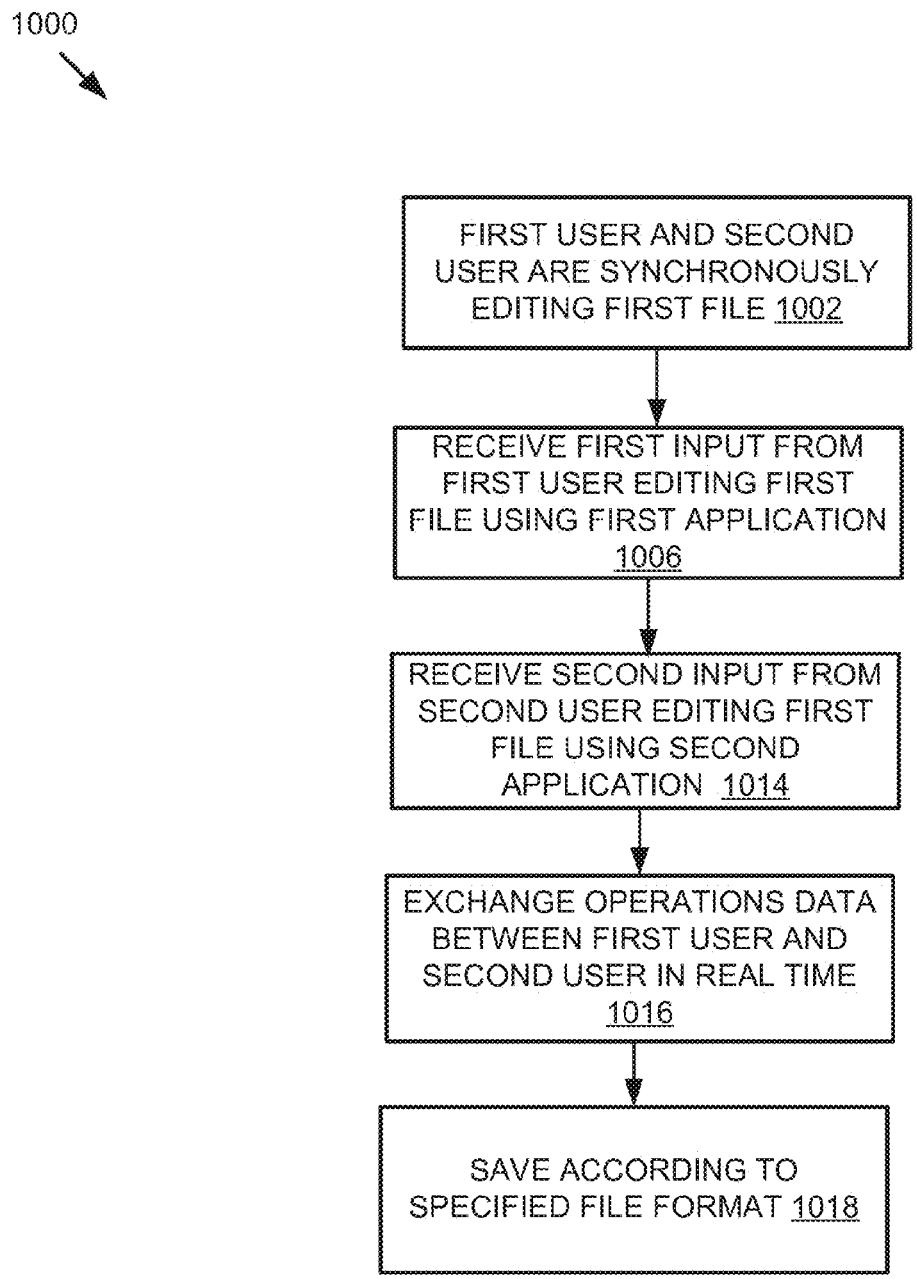

Referring now to FIG. 10, an example of a method 1000 for two or more users to use the content module 199 to synchronously edit content at run time is described, in accordance with at least one embodiment described herein. Method 1000 concerns a method for two or more users to manage content among two or more applications using the content module 199. In the method 1000 all knowledge of how the format schema relates to the user action scenarios and functionality in the application is contained within the operations digest 210 of the content module 199.

A first user and a second user are synchronously editing 1002 a first file. In some implementations, the first user and the second user are contemporaneously editing the first file. The first user may be using a first application having a first format. The second user may be using a second application having a second format. The content module 199 may receive 1006 a first input from a first user editing the first file using the first application. The content module 199 may determine a first operations list 216A based on the first inputs from the first user. The content module 199 may receive 1014 a second input from a second user using the second application. The content module 199 may determine a second operations list 216B based on the second inputs from the second user. The content module 199 may exchange 1016 operations between the first operations list 216A and the second operations list 216B in real time so that the first user and the second user may collaborate on the creation of content even though they may be using different applications that may have different formats. The operations lists 216A, 216B may be used by the content module 199 to translate the file data for the file to the formats of the first application and the second application, respectively. The content module 199 may save 1018 the file according to a specified file format.

Figure 11:
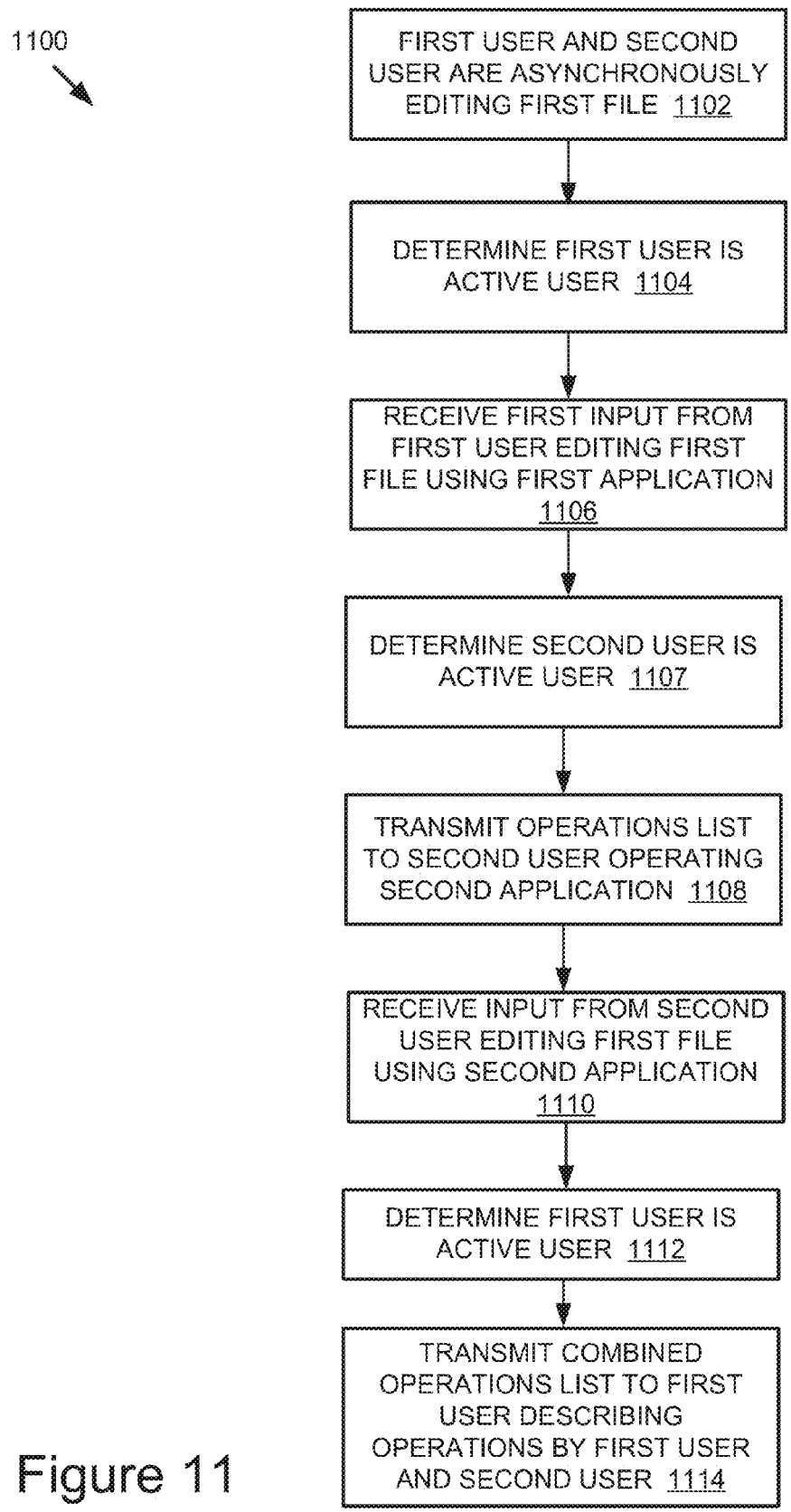

Referring now to FIG. 11, an example of a method 1100 for two or more users to use the content module 199 to asynchronously edit content at run time is described, in accordance with at least one embodiment described herein. Method 1100 concerns a method for two or more users to manage content among two or more applications using the content module 199. In the method 1100 all knowledge of how the format schema relates to the user action scenarios and functionality in the application is contained within the operations digest 210 of the content module 199.

A first user and a second user are asynchronously editing 1102 a first file. The first user may be using a first application having a first format. The second user may be using a second application having a second format. The content module 199 may determine 1104 that the first user is the active user. In other words, the first user is the user presently editing the content. The content module 199 may receive 1106 a first input from a first user editing the first file using the first application. The content module 199 may determine a first operations list 216A based on the first inputs from the first user.

The content module 199 may determine 1107 that the second user is the active user. Responsive to determining that the second user is the active user, the content module 199 may transmit 1108 the first operations list 216 to the second application. The content module 199 may receive 1110 a second input from the second user editing the first file using the second application. The content module 199 may determine a second operations list 216B associated with the second inputs. The content module 199 may determine combined operations list 218 by merging the first operations list 216A and the second operations list 216B. The content module 199 may determine 1112 that the first user is the active user. The content module 199 may transmit 1114 the combined operations list 218 to the first application.

Figure 12:
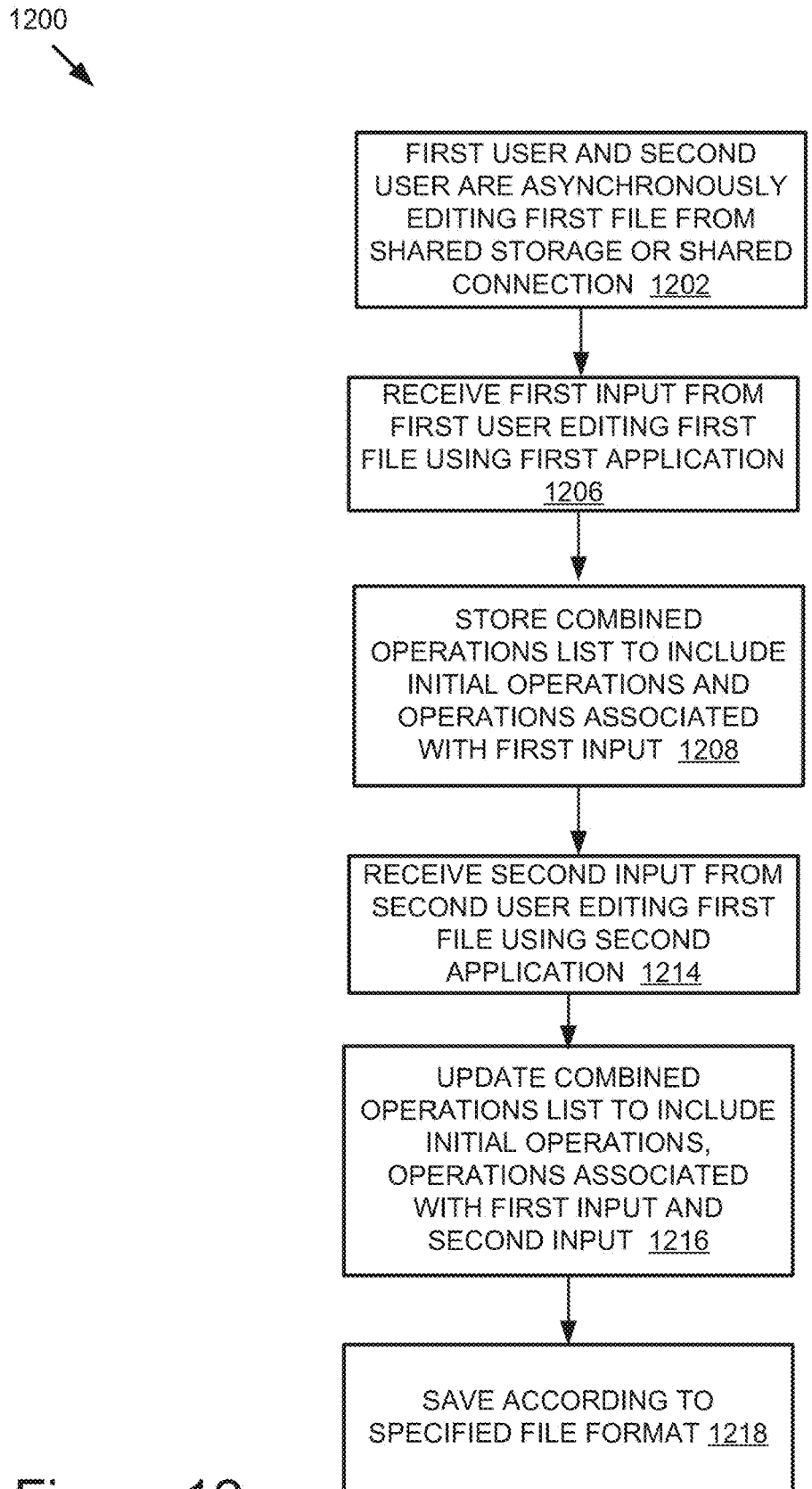

Referring now to FIG. 12, an example of a method 1200 for two or more users to use the content module 199 to asynchronously edit content at run time from shared storage or a shared connection is described, in accordance with at least one embodiment described herein. Method 1200 concerns a method for two or more users to manage content among two or more applications using the content module 199. In the method 1200 all knowledge of how the format schema relates to the user action scenarios and functionality in the application is contained within the operations digest 210 of the content module 199.

A first user and a second user are asynchronously editing 1202 a first file from shared storage or a shared connection. The first user may be using a first application having a first format. The second user may be using a second application having a second format. The content module 199 may receive 1206 a first input from a first user editing the first file using the first application. The content module 199 may determine a combined operations list 218 based on the first inputs from the first user and the initial state of the content in the first file. The content module 199 may store 1208 the combined operations list.

The content module 199 may receive 1214 a second input from the second user editing the first file using the second application. The content module 199 may update 1216 the combined operations list to include the operations associated with the second inputs. The content module 199 may save 1218 the file data according to a specified format.

Figure 13A:
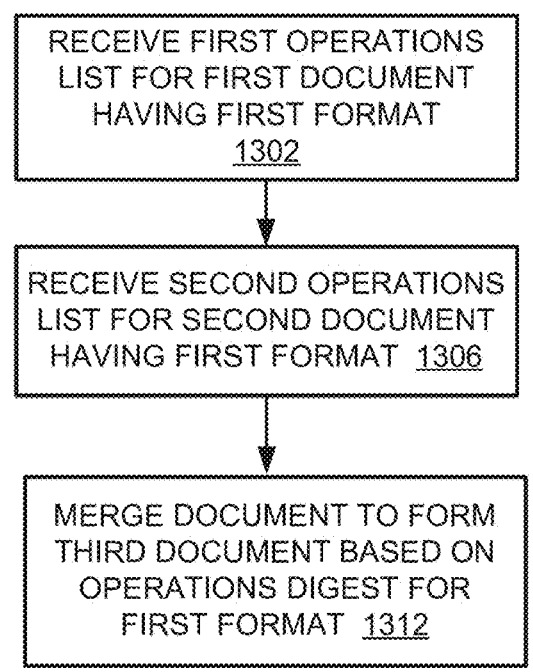
FIG. 13A illustrates an example method for merging operations lists.

Referring now to FIG. 13A, an example of a method 1300 for the content module 199 to merge two or more operations lists 216 is described, in accordance with at least one embodiment described herein. The content module 199 receives 1302 a first operations list 216A for a first document having a first format. The content module 199 receives 1306 a second operations list 216B for a second document having a second format. The content module 199 merges 1312 the first and the second operations lists 216A, 216B to form a combined operations list 218 that includes a sequence of all the operations included in the first operations list 216A and all the operations included in the second operations list 216B. The sequence of the operations in the combined operations list 218 may be based on the time each operation was received. In some implementations, operations from one of the operations lists 216A, 216B may cancel or modify operations in the other operations list, and the combined operations list 218 may include operations to reflect the cumulative effect of these operations. In some implementations, the combined operations list 218 may be used to generate a third document that includes the operations included in the combined operations list 218.

Figure 13B:
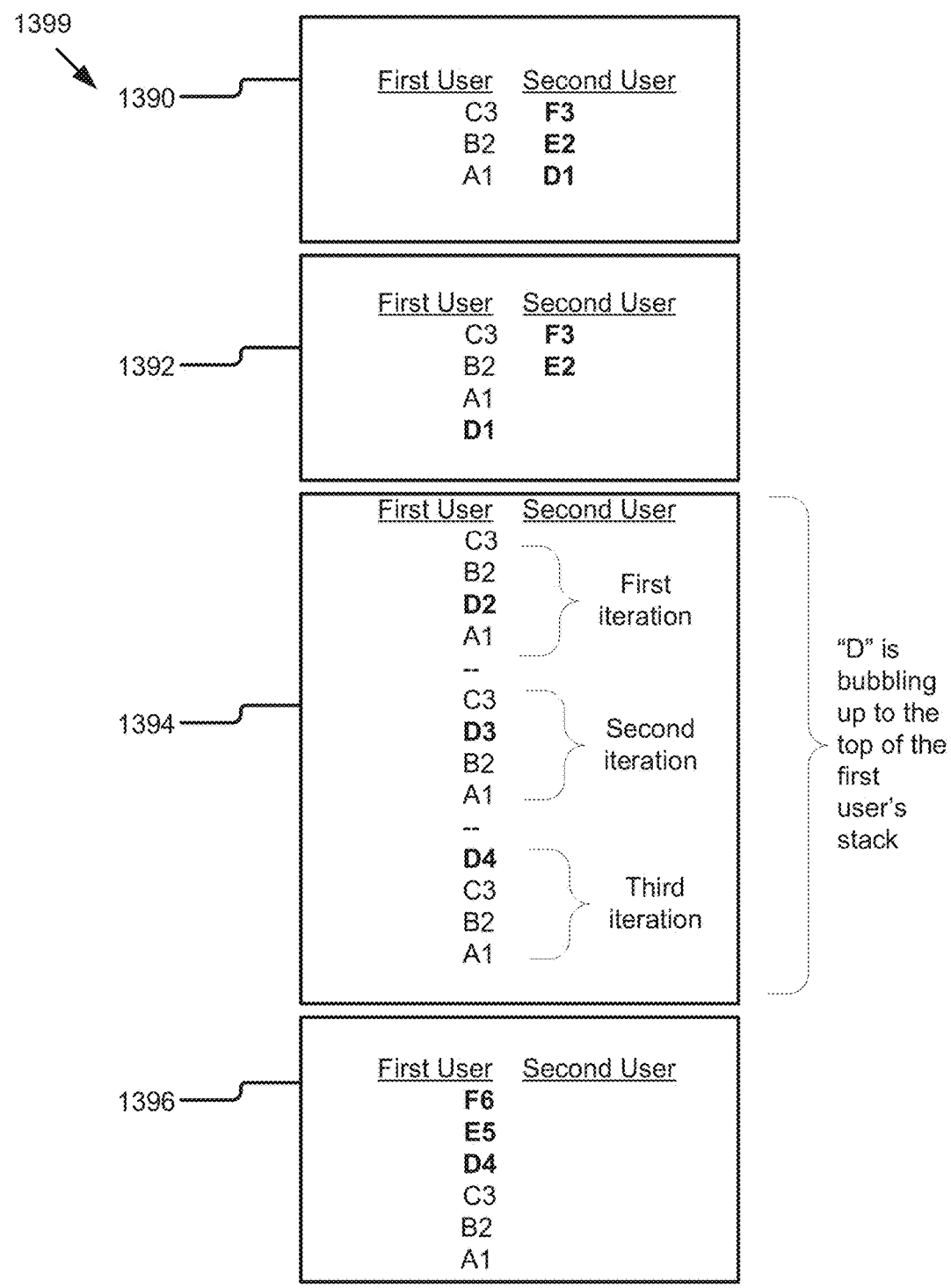
FIG. 13B illustrates a block diagram of an example for merging operations.

Referring now to FIG. 13B, a block diagram is depicted illustrating a merge operation 1399 performed by the content module 199 for a first user's stack and a second user's stack. The alphabet characters in FIG. 13B represent operations in content. The numerical characters following the alphabet characters represent the position of the operations in the content. For example, consider the first user's stack in element 1390. At the top of the stack is "C3." Here, "C3" represents an operation referred to as "C." The "C" operation is the "3" position of the content.

Referring now to element 1390, a first user has added operation A. The first user's stack indicates that operation A was received first in time because operation A is at the bottom of the stack. Operation A is at the "1" position in the content. Next in time the first user added operation B.

Operation B is at the "2" position in the content. Then the first user added operation C. Operation C is at the "3" position in the content.

Still referring to element 1390, the second user has added operation D. The second user's stack indicates that operation D was received first in time because operation D is at the bottom of the stack. Operation D is at the "1" position in the content. Next in time the second user added operation E. Operation E is at the "2" position in the content. Then the second user added operation F. Operation F is at the "3" position in the content.

In this example, the second user's operations occurred later in time relative to the first user's operations. Accordingly, we would expect that the second user's operations will be at the top of the first user's stack once the merge is completed.

Referring now to element 1392, the content module 199 begins to merge the second user's stack to the first user's stack. To merge the stacks, the content module 199 moves the bottom single card of the second user's stack and moves it to the bottom of the first user's stack.

Referring to element 1394, the content module 199 switches the two operations and changes the position of operations accordingly. This process is repeated. Looking at the third depicted iteration, operation D is in the first user's stack and placed at the "4" position of the content. The first user's stack indicates that operation D was received later in time than operations C, B, or A since operation D is at the top of the first user's stack.

Referring to element 1396, the content module 199 repeats the process described above until the F, E, and D operations are in the first user's stack. The first user's stack indicates that operation F was received later in time than operations E, D, C, B, or A since operation F is at the top of the first user's stack.

Figure 14:
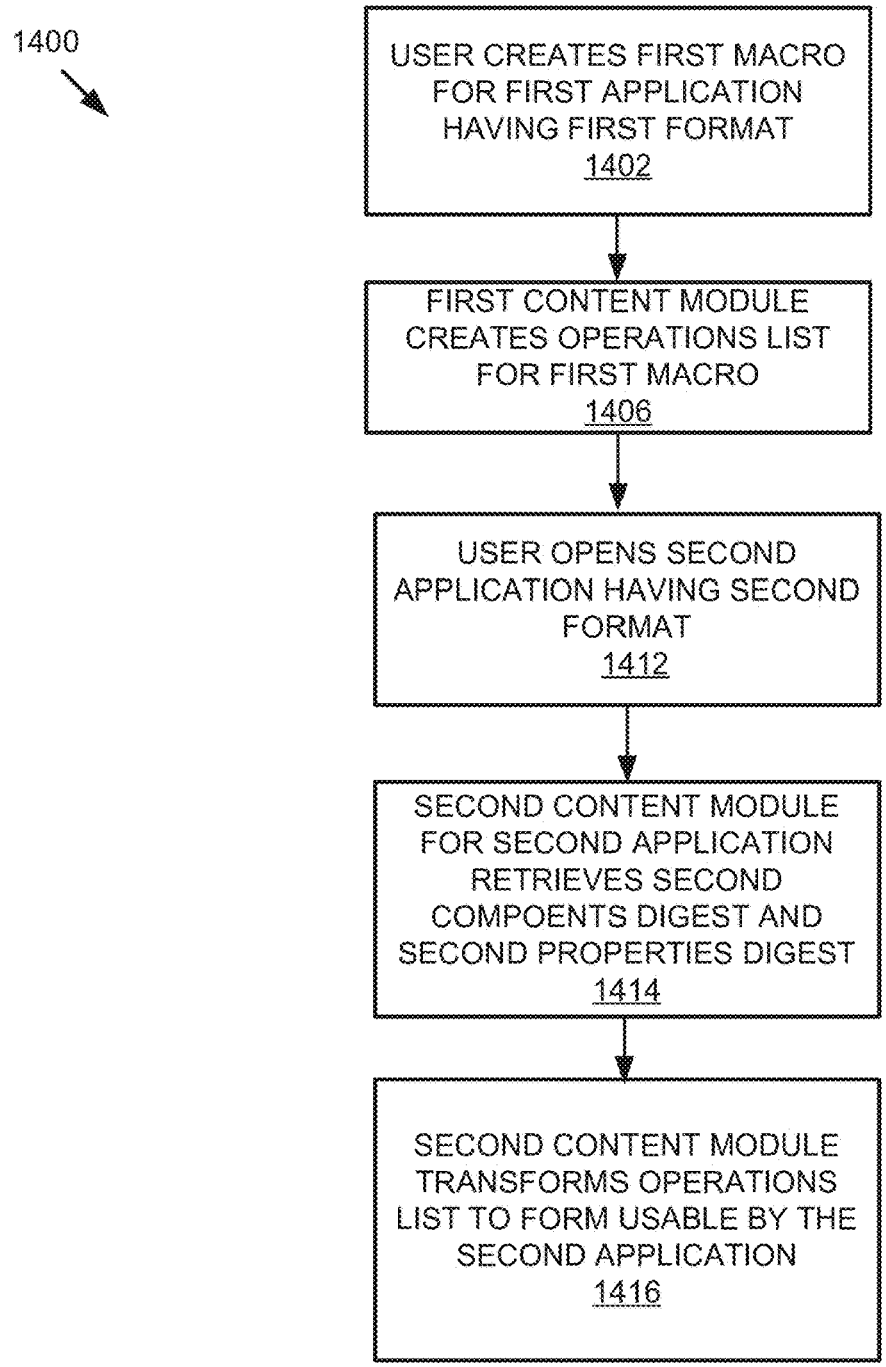
FIG. 14 illustrates an example method for using the content module to use a macro having a first format in an application having a specified format.

Referring now to FIG. 14, an example of a method 1400 for two or more applications each having different formats to exchange macros is described, in accordance with at least one embodiment described herein. Two different applications implement different content modules 199A, 199B. For example, a first application 195 implements a first content module 199A and a second application 197 implements a second content module 199B. The first application 195 has a first format and the second application 197 has a second format. The first format and the second format are different. The first application 195 may have a different schema than the second application 197. The content modules 199A, 199B enable the applications 195, 197 to exchange a macro without knowledge or coordination between the applications 195, 197. The macro may be configured to modify content.

A user creates 1402 a first macro for the first application 195 having a first format. The first application 195 has a first format. The user may save the macro. The first content module 199A may create 1406 an operations list 216 (or combined operations list 218) describing the macro. The first content module 199A may create the operations list using a first components digest 212A and a first properties digest 214A selected by the first content module 199A based on the schema or format of the macro. The first content module 199A may be associated with the first application 195. The first content module 199A may save the operations list 216 (or combined operations list 218). The user opens a second application 197 having a second format that is different from the first format. The second application 197 may be associated with a second content module 199B. The user may provide an input to execute the macro in the second application 197. The second content module 199B may analyze the macro to determine the format of the macro. The second content module 199B may retrieve 1414 a second components digest 212A and a second properties digest 214B. The second content module 199B may use the second components digest 212B and the second properties digest 214B to transform 1416 the operations list 216 (or combined operations list 218) to a form usable by the second application 197. In some implementations, the second content module 199B may transform the operations to form a second macro usable by the second application 197. In other implementations, the second content module 199B may use the operations list 216 (or combined operations list 218) to generate signals or commands that are transmitted to the second application 197; the signals or commands may be configured to achieve the functionality of the first macro in the second application.

Figure 18:
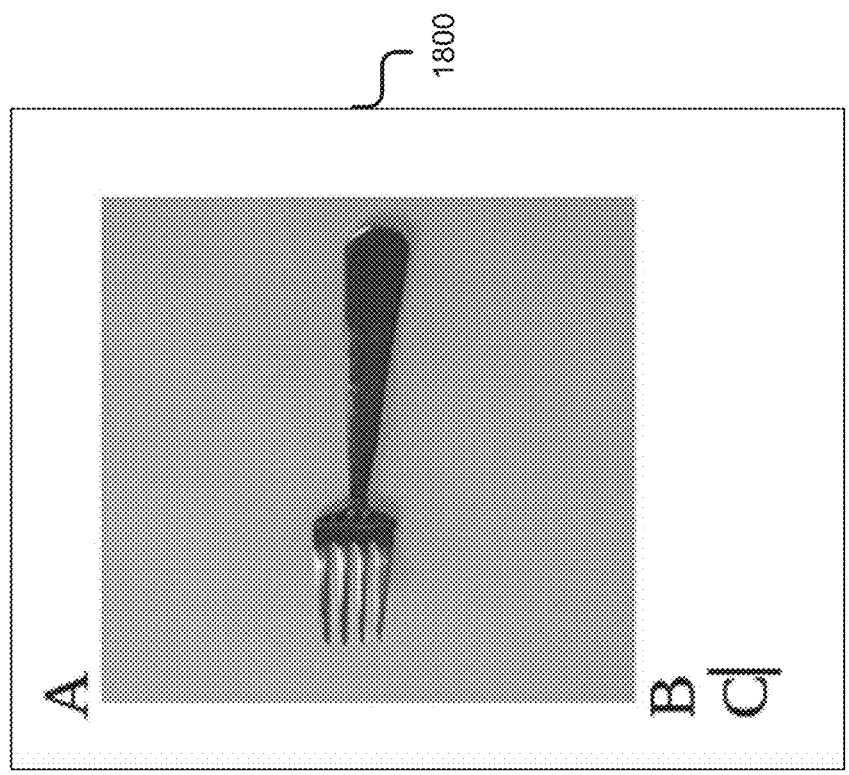
Figure 17:
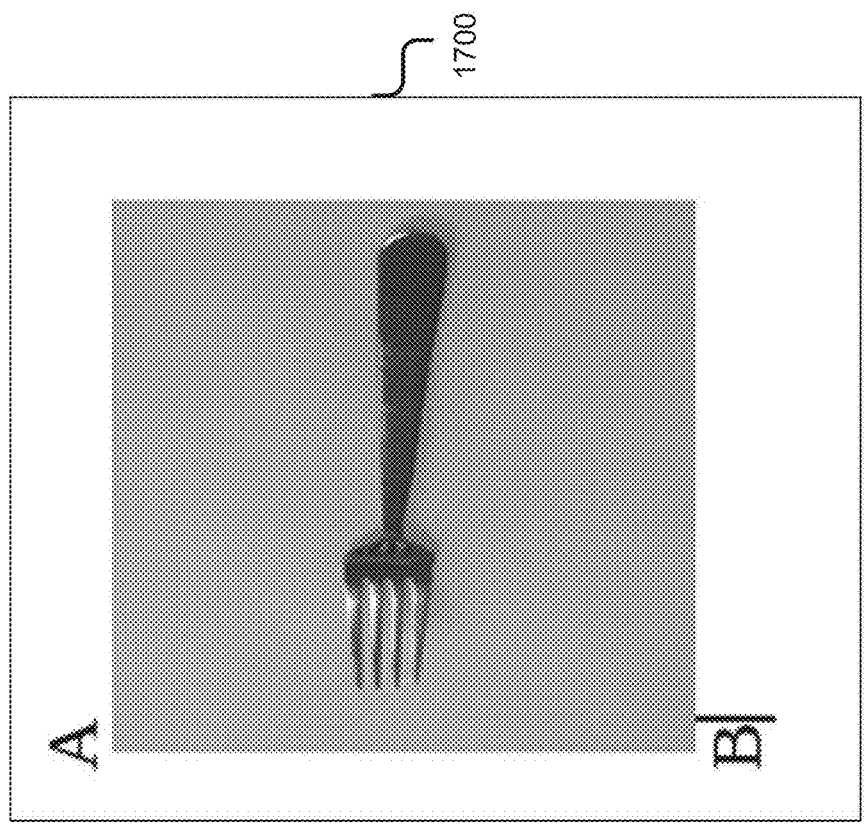

FIGS. 15-20 illustrate an example of content being processed by the content module 199. Element 1500 is depicted in FIG. 15. Element 1600 is depicted in FIG. 16. Element 1700 is depicted in FIG. 17. Element 1800 is depicted in FIG. 18. Element 1900 is depicted in FIG. 19. Element 2000 is depicted in FIG. 2. Elements 1500, 1600, 1700, 1800, 1900 and 2000 depict the content represented by element 1500 being processed by the content module 199 from a first format (e.g., .XML) to a specified format (e.g., JSON) that is different from the first format, and then transformed back to the first format as shown in element 2000. This is an example of a "roundtrip transformation."

In one implementation, FIG. 15 depicts a first content 1500 in a start document, according to some embodiments. For example, the first content 1500 is a document. The first content 1500 is a snippet of XML from an ODF text document. For example, the first content 1500 is a subset of the content.xml file, which is zipped as part of the overall OpenDocument Text document. The first content 1500 shows a sequence of three paragraphs (or paragraph components). The first paragraph contains only a character "A," the last the character "B," and the middle paragraphs contains an image component which is referenced from the Internet, using the hypothetical locator "http://home/pic.png." This locator is only being used by way of example, and not to incorporate content into this detailed description. In this example the image component consists in opposite of the singular paragraphs out of two XML elements, <text:frame> and the containing <text:image>. The design idea of ODF was that the text:frame only contains the size and consistency of the frame, here 26 millimeter square, while there might be multiple content elements within the frame, where the first applicable by the application is being shown. Here, only one image element is included. In some embodiments, there is an OLE XML element followed by an image to provide a view on Linux systems not capable of Windows OLE entities.

FIG. 16 depicts the first content 1500 of the start document as first operations 1600 in JSON (JavaScript Object Notation), according to some embodiments. Here the first operations 1600 are a sequence of operations. This may be an example of an operations list 216. In this example the value of the "name" property is a concatenation of the operation metatype (here only "insert") and the component name, here Paragraph, Text and Image. The argument "attrs" contains all component properties, like the locator or size of the image. In this example all length measurements have been normalized to a 100th of millimeter as common denominator. In this example the "start" parameter defines the position of the component addressed at the time when the operation was executed. Here it starts similar as XML with "1" as first component. "1,1" indicates the first child of the first component, and so on. As a document had been loaded, all operations are sorted in document order and only insert document exist. It is a condensed sequence of operations, or a normalized operations sequence.

FIG. 17 depicts the first content 1500 of the start document rendered as a second document 1700 in an editor, according to some embodiments. Element 1700 includes three paragraphs with its content: (1) the "A"; (2) the image; and (3) the "B." Also depicted in element 1700 is a cursor behind the "B" ready to accept a new user input.

FIG. 18 depicts edited content 1800, according to some embodiments. Here, the start document shown in FIG. 15 is edited in an editor to form edited content 1800. Edited content 1800 includes a new paragraph with the content "C" that was not included in the start document.

FIG. 19 depicts the edited content 1800 as second operations 1900 in JSON, according to some embodiments. This may be an example of a combined operations list 218. The second operations 1900 includes a combined operation sequence of the loaded document and user actions. The second operations include two new operations new operations (here separated by an empty line for visibility) not present in the first operations 1600: the insertion of text in the exiting third paragraph; and the split of the paragraph into a new forth one, just before the new inserted "C" moving this letter to the new paragraph.

FIG. 20 new content 2000 in an end document based off the second operations 1900, according to some embodiments. The second operations have been transformed by the content module 199 back to an OpenDocument Text file, where again we only see a subset of the content.xml of the zipped package for the sake of simplicity. The new content 2000 includes a new XML element <text:p>C</text:p> where one letter "C" had been added at the end of the content 2000.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it may be understood that the various changes, substitutions, and alterations could be made hereto without departing from the spirit and scope of the invention.

What is claimed is:

1. A method comprising:
   receiving an electronic document at run time representing one or more operations modifying first file data having a first format, wherein the electronic document comprises an entire self-contained document;
   determining the first format of the first file data;
   determining a first components digest and a first properties digest based on the first format;
   determining which of the operations to transform based on an operations digest;
   transforming the electronic document to a list of operations describing supported operations using the first components digest and the first properties digest;
   rendering the electronic document including second file data having a second format based on the list of operations describing supported operations;
   receiving user input modifying the second file data;
   transforming the user input to a list of operations describing changes made to the electronic document in the second format; and
   determining which operations in the second file data to transform based on the operations digest.

2. The method of claim 1, wherein the list of operations describing supported operations includes a sequence of the operations arranged in an order in which they were received.

3. The method of claim 1, wherein the list of operations describing supported operations includes a description of all supported operations.

4. The method of claim 1, wherein the first file data describes a macro that may be used among applications having different formats.

5. The method of claim 1, further comprising determining to transform the list of operations describing supported operations to file data having a specified format.

6. The method of claim 5, wherein the specified format is the second format and is different from the first format and further comprising:

determining a second components digest and a second properties digest based on the specified format; and transforming, using the second components digest and the second properties digest, the list of operations describing supported operations to the file data having the second format and from the list of operations describing supported operations so that the file data may be rendered to depict one or more semantic components, one or more properties associated with the semantic components, and one or more attributes associated with the properties as they would be rendered in the first format.

7. A method comprising:

receiving an electronic document at run time including first file data having a first format and including one or more operations represented by one or more semantic components, one or more properties associated with the semantic components, and one or more attributes associated with the properties;

determining the first format of the first file data;

determining a first components digest and a first properties digest based on the first format;

determining which operations in the first file data to transform based on a first operations digest;

transforming the first file data to a first list of operations describing supported operations using the first components digest and the first properties digest;

rendering the electronic document including second file data having a second format based on the first list of operations;

receiving user input modifying the second file data;

transforming the user input to a second list of operations describing changes made to the electronic document in the second format;

determining which operations in the second file data to transform based on a second operations digest; and determining a second combined operations list, wherein the second combined operations list includes both the first list of operations describing supported operations using the first components digest and the first properties digest and the second list of operations describing changes made to the electronic document in the second format.

8. The method of claim 7, wherein the electronic document is received entirely in the first format at run time, the first format is determined for the entire first file data, and the electronic document is rendered entirely in only the second format.

9. The method of claim 7, wherein the electronic document is rendered to be semantically equivalent in the second format to the electronic document in the first format.

10. The method of claim 7, wherein the first components digest includes a description of all possible semantic components associated with a supported application user scenario and all possible operations necessary to achieve the supported application user scenario.

11. The method of claim 7, further comprising determining to transform the first list of operations to the second file data having a specified format.

12. The method of claim 11, wherein the specified format is the second format and is different from the first format, the method further comprising:

determining a second components digest and a second properties digest based on the specified format; and transforming, using the second components digest and the second properties digest, the first list of operations to the second file data having the second format and including each supported operation from the first file data so that the second file data may be rendered to depict the one or more semantic components, the one or more properties associated with the semantic components, and the one or more attributes associated with the properties as they would be rendered by the first file data.

13. The method of claim 7, wherein the first properties digest includes a description of all possible properties for each semantic component and all possible attributes for each possible property.

* * * * *